United States Patent
Lee et al.

(10) Patent No.: US 12,022,489 B2
(45) Date of Patent: *Jun. 25, 2024

(54) METHOD FOR RECEIVING DOWNLINK CONTROL INFORMATION BY UE IN WIRELESS COMMUNICATION SYSTEM, AND APPARATUS FOR SAME

(71) Applicant: LG ELECTRONICS INC., Seoul (KR)

(72) Inventors: Seungmin Lee, Seoul (KR); Hanbyul Seo, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,319

(22) Filed: Jan. 23, 2023

(65) Prior Publication Data
US 2023/0180253 A1 Jun. 8, 2023

Related U.S. Application Data

(63) Continuation of application No. 17/169,066, filed on Feb. 5, 2021, now Pat. No. 11,570,766, which is a
(Continued)

(51) Int. Cl.
*H04W 72/00* (2023.01)
*H04L 5/00* (2006.01)
(Continued)

(52) U.S. Cl.
CPC ........... *H04W 72/23* (2023.01); *H04L 5/0053* (2013.01); *H04L 5/0096* (2013.01); *H04L 5/14* (2013.01);
(Continued)

(58) Field of Classification Search
None
See application file for complete search history.

(56) References Cited

U.S. PATENT DOCUMENTS

| | | | |
|---|---|---|---|
| 9,661,589 B2 | 5/2017 | Ouchi | H04W 52/362 |
| 10,264,437 B2 | 4/2019 | Poitau | H04W 76/14 |

(Continued)

FOREIGN PATENT DOCUMENTS

| | | |
|---|---|---|
| CN | 101646229 A | 2/2010 |
| CN | 101772179 A | 7/2010 |

(Continued)

OTHER PUBLICATIONS

Samsung, "Semi-static reconfiguration of TDD UL-DL configuration", 3GPP TSG RAN WG1 Meeting #69, May 21-25, 2012, R1-122266.

(Continued)

*Primary Examiner* — Gerald A Smarth
(74) *Attorney, Agent, or Firm* — BRYAN CAVE LEIGHTON PAISNER LLP

(57) ABSTRACT

The present invention relates to a method for receiving control information by a UE in a wireless communication system, and an apparatus for same. More specifically, the method includes a step of receiving reconfiguration downlink control information (DCI), wherein the reconfiguration DCI includes a plurality of reconfigurations relating to a UE group including the UE and is configured so as to be received on the basis of a radio network temporary identifier (RNTI) defined for the reconfiguration DCI.

15 Claims, 15 Drawing Sheets

Related U.S. Application Data continuation of application No. 16/513,424, filed on Jul. 16, 2019, now Pat. No. 10,952,202, which is a continuation of application No. 15/475,940, filed on Mar. 31, 2017, now Pat. No. 10,945,247, which is a continuation of application No. 14/759,839, filed as application No. PCT/KR2014/000761 on Jan. 27, 2014, now Pat. No. 9,648,603.

(60) Provisional application No. 61/864,485, filed on Aug. 9, 2013, provisional application No. 61/825,029, filed on May 18, 2013, provisional application No. 61/821,705, filed on May 9, 2013, provisional application No. 61/820,148, filed on May 6, 2013, provisional application No. 61/757,738, filed on Jan. 29, 2013, provisional application No. 61/757,095, filed on Jan. 26, 2013.

(51) Int. Cl.
*H04L 5/14* (2006.01)
*H04W 72/0453* (2023.01)
*H04W 72/23* (2023.01)
*H04W 76/27* (2018.01)
*H04W 72/04* (2023.01)

(52) U.S. Cl.
CPC ....... *H04W 72/0453* (2013.01); *H04W 76/27* (2018.02); *H04W 72/04* (2013.01)

(56) References Cited

U.S. PATENT DOCUMENTS

| | | | |
|---|---|---|---|
| 2009/0268693 A1 | 10/2009 | Indh et al. | |
| 2010/0034139 A1 | 2/2010 | Love | H04L 1/0029 370/328 |
| 2010/0151874 A1 | 7/2010 | Cai et al. | |
| 2010/0317360 A1 | 12/2010 | McBeath | H04L 5/0091 455/450 |
| 2011/0103288 A1 | 5/2011 | Lee | H04W 48/12 370/312 |
| 2011/0105136 A1 | 5/2011 | Chi | |
| 2011/0110315 A1 | 5/2011 | Chen | H04L 5/0053 370/329 |
| 2011/0134774 A1 | 6/2011 | Pelletier et al. | |
| 2011/0194428 A1 | 8/2011 | Wang | H04W 72/005 370/252 |
| 2011/0310818 A1 | 12/2011 | Lin | H04W 72/042 370/328 |
| 2012/0009923 A1 | 1/2012 | Chen | H04L 5/0053 455/434 |
| 2012/0069802 A1 | 3/2012 | Chen | H04L 5/001 370/329 |
| 2012/0129540 A1 | 5/2012 | Hakola | H04W 72/042 455/450 |
| 2012/0208583 A1 | 8/2012 | Chung | H04L 5/001 455/509 |
| 2012/0281646 A1 | 11/2012 | Liao | H04W 72/042 370/329 |
| 2012/0300714 A1 | 11/2012 | Ng | H04W 56/0045 370/329 |
| 2012/0327904 A1 | 12/2012 | Park | H04L 5/0007 370/331 |
| 2013/0010709 A1 | 1/2013 | Earnshaw et al. | |
| 2013/0010720 A1 | 1/2013 | Lohr | H04L 5/0057 370/329 |
| 2013/0083739 A1 | 4/2013 | Yamada | H04W 74/006 370/329 |
| 2013/0155969 A1 | 6/2013 | Moon et al. | |
| 2013/0163532 A1 | 6/2013 | Anderson | H04W 72/04 370/329 |
| 2013/0188516 A1 | 7/2013 | He | H04B 17/318 370/254 |
| 2013/0195066 A1 | 8/2013 | Lee | H04W 52/04 370/329 |
| 2013/0303214 A1 | 11/2013 | Ahmadi | H04W 72/1215 455/501 |
| 2014/0334391 A1 | 11/2014 | Khoshnevis | H04L 5/0057 370/329 |
| 2014/0355539 A1* | 12/2014 | Yang | H04L 1/1893 370/329 |
| 2014/0376460 A1 | 12/2014 | Hooli et al. | |

FOREIGN PATENT DOCUMENTS

| | | | |
|---|---|---|---|
| CN | 102687453 A | 9/2012 | |
| KR | 1020110102145 | 9/2011 | |
| KR | 1020120135435 | 12/2012 | |
| KR | 10-2012-0103200 A | 9/2020 | |
| WO | 2011112037 A2 | 9/2011 | |
| WO | WO-2012015214 A2 * | 2/2012 | ........... H04L 1/0028 |
| WO | 2012150806 A3 | 11/2012 | |
| WO | WO-2012146095 A1 * | 11/2012 | ........... H04L 5/0053 |
| WO | WO-2013005991 A2 * | 1/2013 | ........... H04J 11/0053 |

OTHER PUBLICATIONS

Alcatel-Lucent, "Further discussions on DCI overhear reduction for carrier aggregation," 3GPP TSG RAN WG1 Meeting #66bis Zhuhai, China, Oct. 2011, R1-113309, 5 pages.

Alcatel Lucent, "Further discussions on DCI overhear reduction for carrier aggregation, " 3GPP TSG RAN WG1 Meeting #66bis Zhuhai, China, Oct. 2011, RI-113309, 5 pages.

R1-130321 : 3GPP TSG RAN WG1, "Signaling mechanisms for TDD UL-DL reconfiguration," Panasonic, Meeting #72, St Julian's, Malta, Jan. 28-Feb. 1, 2013, (3 Pages).

R1-122363: 3GPP TSG-RAN WG1 Meeting #69, Prague, Czech Republic, May 21-25, 2012, Renesas Mobile Europe Ltd., "Discussion on Enhancements for Dynamic TDD UL-DL Configuration," (4 pages).

R1-122909: 3GPP TSG RAN WG1 Meeting #69, Prague, Czech Republic, May 21-25, 2012, Huawei, HiSilicon, "Methods to support different time scales for TDD UL-DL reconfiguration," (4 pages).

SAMSUNG: "Dynamic reconfiguration of TDD UL-DL configuration", R1-122267, 3GPP TSG RAN WG1 Meeting #69, Prague, Czech Republic, May 21-25, 2012.

U.S. Appl. No. 17/169,066, filed Feb. 5, 2021.

U.S. Appl. No. 16/513,424, filed Jul. 16. 2019, now U.S. Pat. No. 10,952,202.

U.S. Appl. No. 15/475,940, filed Mar. 31, 2017, now U.S. Pat. No. 10,945,247.

U.S. Appl. No. 14/759,839, filed Jul. 8, 2015, now U.S. Pat. No. 9,648,603.

* cited by examiner

FIG. 2
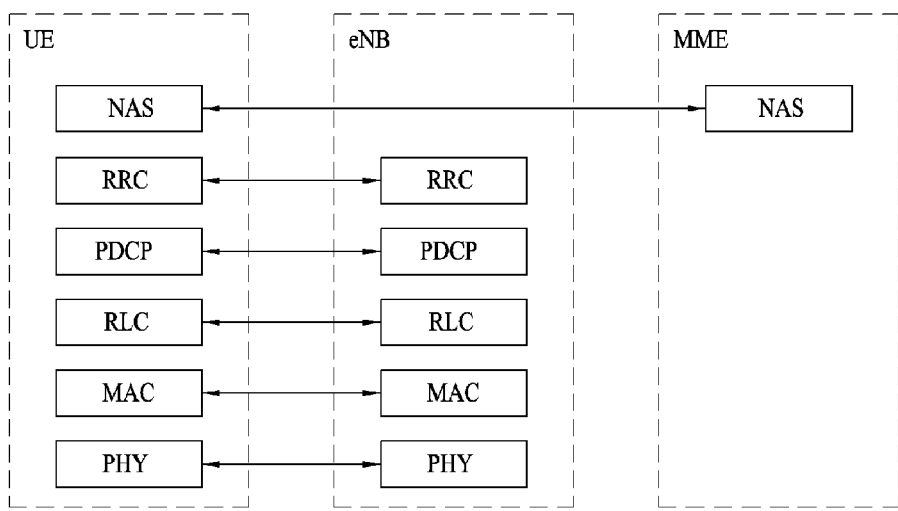
(a) Control-Plane Protocol Stack
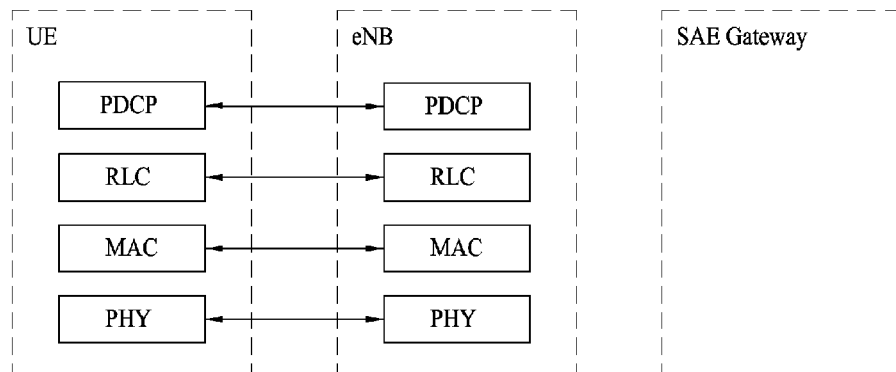
(b) User-Plane Protocol Stack FIG. 7
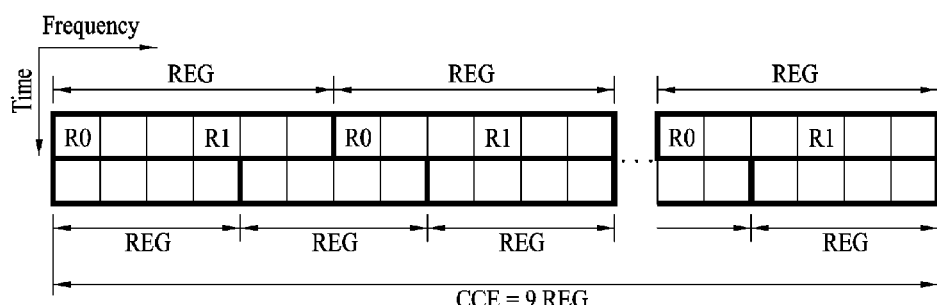
(a) 1TX or 2TX
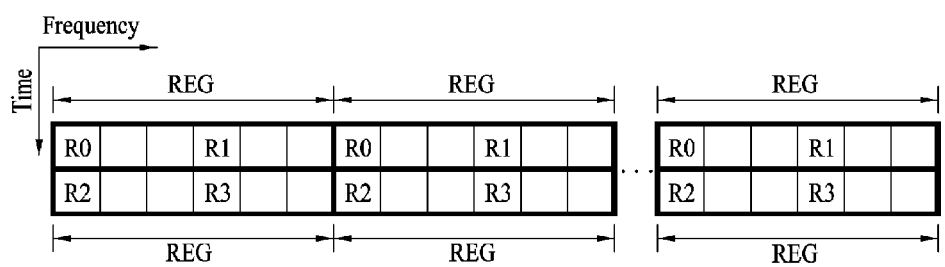
(b) 4 TX

| UL/DL Configuration #A for Cell #0 | UL/DL Configuration #B for Cell #1 | ... | UL/DLConfiguration #C for Cell #M |
|---|---|---|---|

Change-of-use information about M cells

METHOD FOR RECEIVING DOWNLINK CONTROL INFORMATION BY UE IN WIRELESS COMMUNICATION SYSTEM, AND APPARATUS FOR SAME

This application is a continuation of U.S. patent application Ser. No. 17/169,066 filed Feb. 5, 2021, which is a continuation of U.S. patent application Ser. No. 16/513,424 filed Jul. 16, 2019, now U.S. Pat. No. 10,952,202, which is a continuation of U.S. patent application Ser. No. 15/475,940 filed Mar. 31, 2017, now U.S. Pat. No. 10,945,247, which is a continuation of U.S. patent application Ser. No. 14/759,839 filed Jul. 8, 2015, now U.S. Pat. No. 9,648,603, which is a 35 U.S.C. § 371 National Stage entry of International Application No. PCT/KR2014/000761 filed Jan. 27, 2014, which claims benefit of U.S. Provisional Nos. 61/864,485 filed Aug. 9, 2013; 61/825,029 filed May 18, 2013; 61/821,705 filed May 9, 2013; 61/820,148 filed May 6, 2013; 61/757,738 filed Jan. 29, 2013; and U.S. Pat. No. 6,157,095 filed Jan. 26, 2013, all of which are incorporated by reference for all purposes as if fully set forth herein.

TECHNICAL FIELD

The present invention relates to a wireless communication system and, more particularly, to a method for receiving downlink control information by a user equipment in a wireless communication system, and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method for receiving downlink control information by a user equipment in a wireless communication system, and an apparatus for the same.

Objects of the present invention are not limited to the aforementioned object, and other objects of the present invention which are not mentioned above will become apparent to those having ordinary skill in the art upon examination of the following.

Technical Solution

The object of the present invention can be achieved by providing a method for receiving control information by a user equipment (UE) in a wireless communication system, including receiving reconfiguration downlink control information (reconfiguration DCI), wherein the reconfiguration DCI includes a plurality of reconfigurations about a UE group including the UE, and is set to be received based on a radio network temporary identifier (RNTI).

The reconfiguration DCI may be set to be transmitted through a common search space (CSS) of a primary cell (PCell).

The RNTI defined for the reconfiguration DCI may be identically configured for the UE group. Preferably, the RNTI defined for the reconfiguration DCI may be configured through UE-specific radio resource control (RRC) signaling.

When the number of bits for the plurality of reconfigurations is less than the number of bits constituting the reconfiguration DCI, unused bits of the bits constituting the reconfiguration DCI may be set to a specific value.

The specific value may be considered as a virtual cyclic redundancy check (virtual CRC) by the UE.

The number of the reconfigurations may be indicated through higher layer signaling or physical layer signaling.

The number of bits constituting the reconfiguration DCI may be indicated through higher layer signaling or physical layer signaling.

The locations of the reconfigurations may be set to differ from each other. Further, information about the locations of the reconfigurations may be indicated through UE-specific signaling.

In another aspect of the present invention, provided herein is a user equipment for receiving control information in a wireless communication system, including a radio frequency unit; and a processor, wherein the processor is configured to receive reconfiguration downlink control information (reconfiguration DCI), wherein the reconfiguration DCI includes a plurality of reconfigurations about a UE group including the UE, and is set to be received based on a radio network temporary identifier (RNTI).

Advantageous Effects

According to embodiments of the present invention, a downlink control signal for a user equipment may be efficiently received in a wireless communication system.

Effects that can be obtained from the present invention are not limited to the aforementioned effect, and other effects may be clearly understood by those skilled in the art from the descriptions given below.

DESCRIPTION OF DRAWINGS

The accompanying drawings, which are included to provide a further understanding of the invention, illustrate embodiments of the invention and together with the description serve to explain the principle of the invention. In the drawings:

FIG. 2 illustrates a control plane and user plane of a radio interface protocol between a user equipment based on the 3GPP wireless access network standard and E-UTRAN.

FIG. 7 shows resource units used to configure a downlink control channel in an LTE system.

BEST MODE

Figure 1:
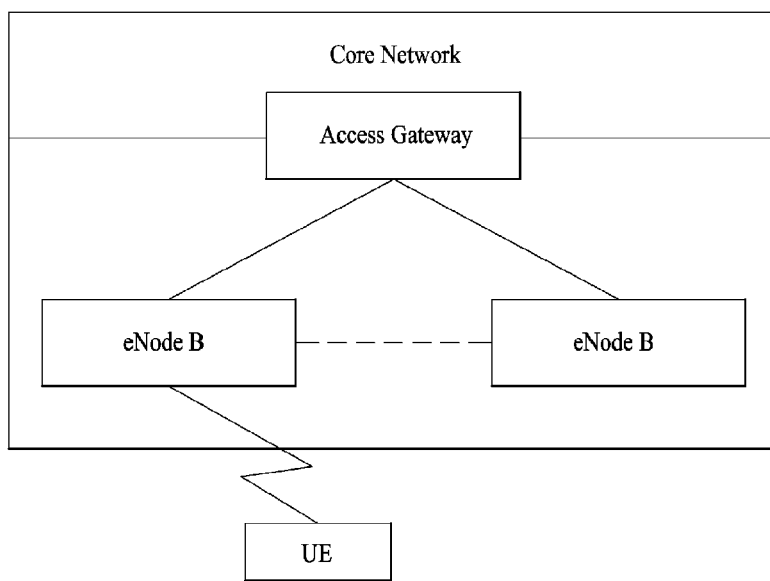
FIG. 1 illustrates an architecture of an E-UMTS network of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting an eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
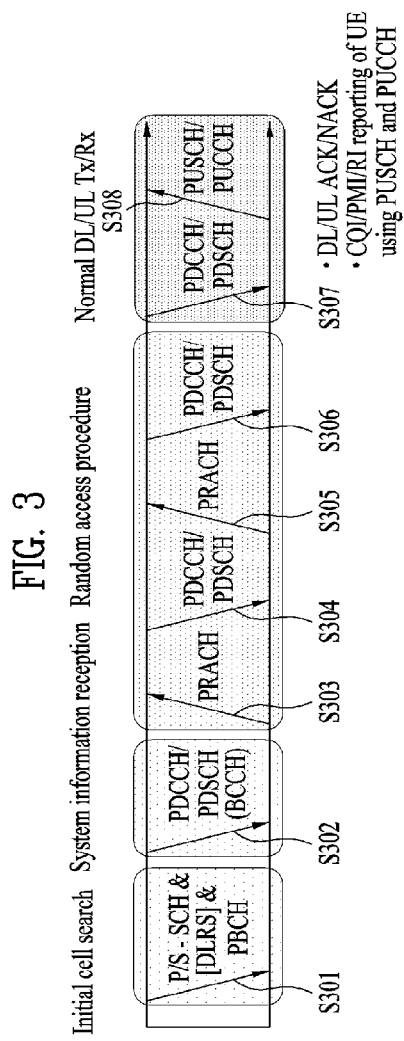
FIG. 3 illustrates physical channels used in a 3GPP LTE system and a general method for transmitting a signal using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
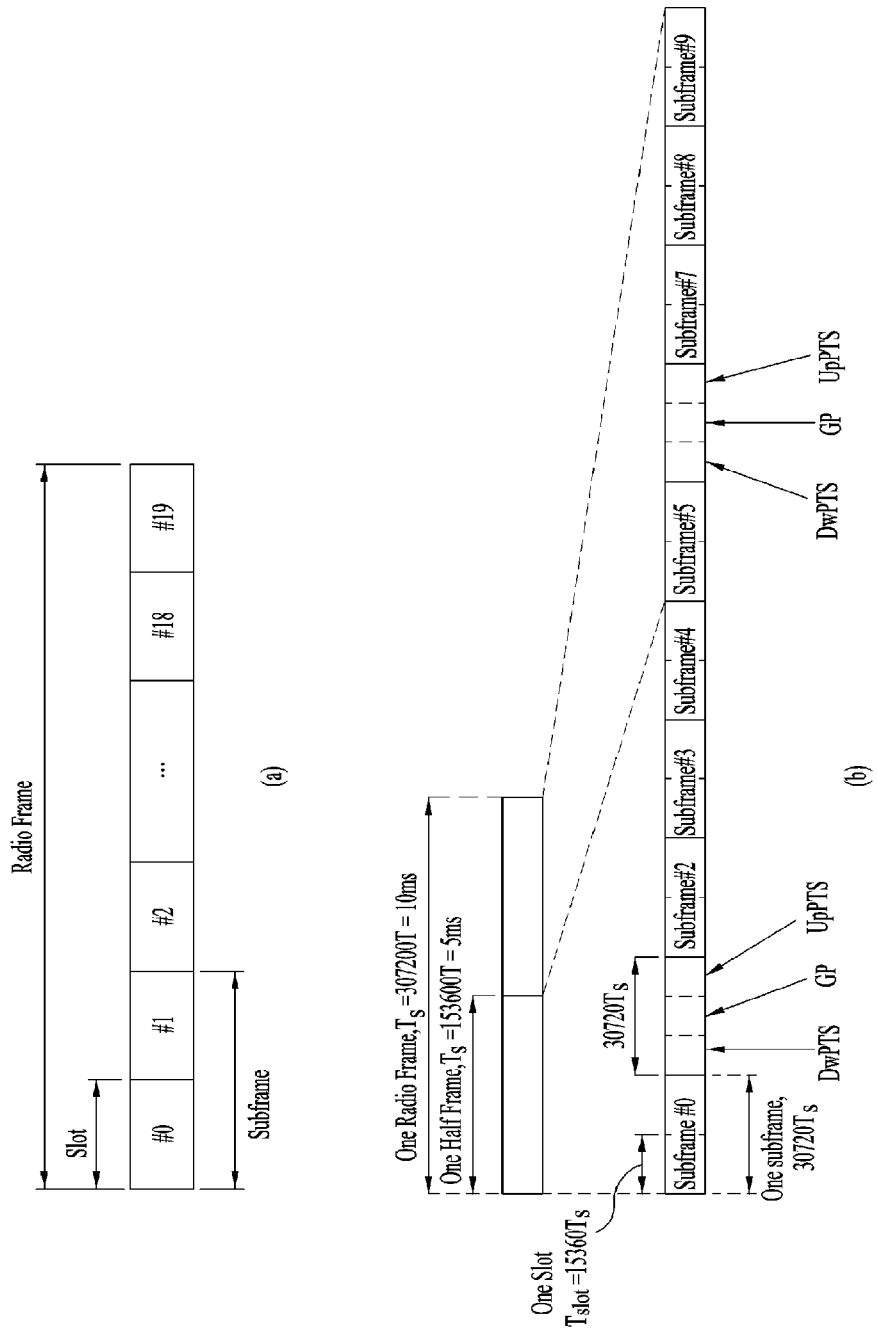
FIG. 4 illustrates the structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below.

Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UU/DL configuration) in the TDD system is as illustrated in Table 2 below.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
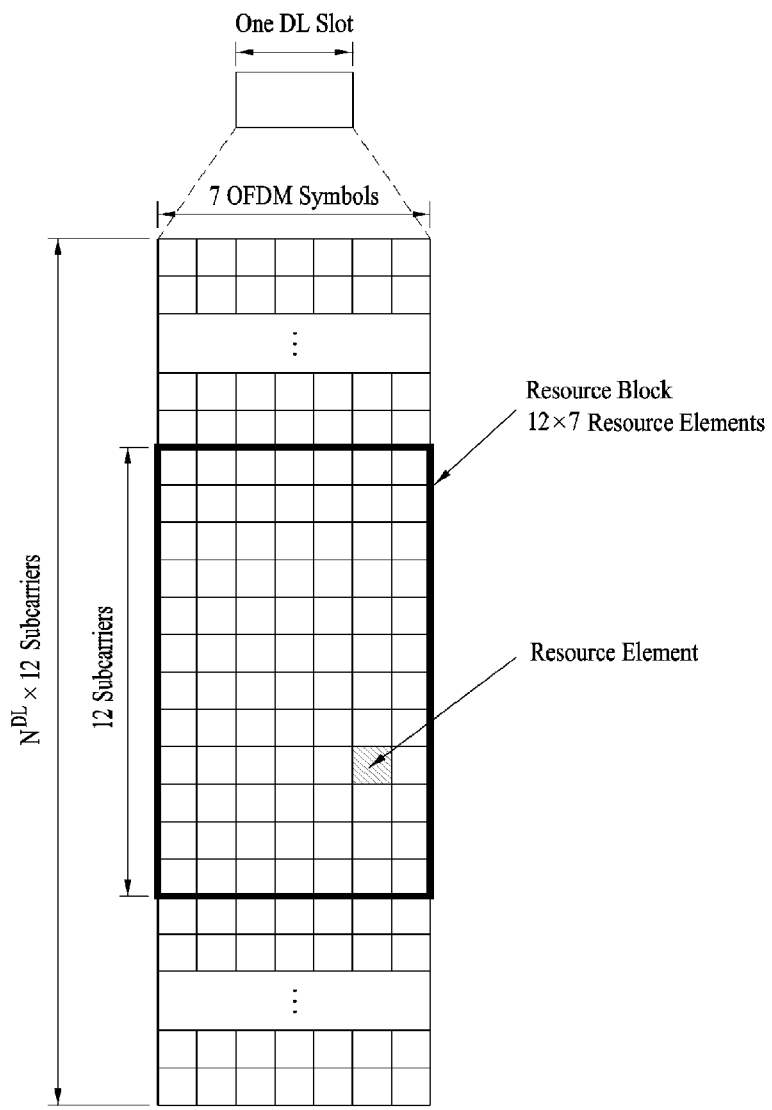
FIG. 5 shows a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
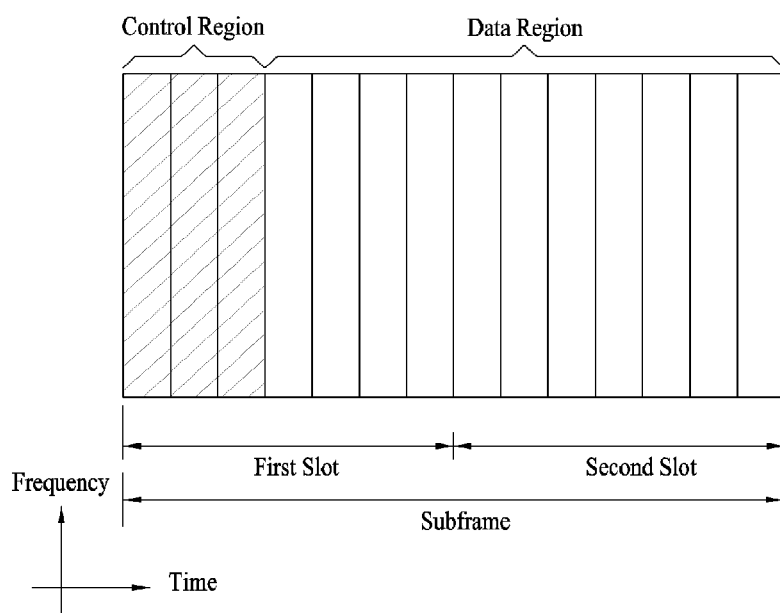
FIG. 6 exemplarily shows a downlink subframe structure.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

FIG. 7 shows resource units used to configure a downlink control channel in an LTE system. In particular, FIG. 7(*a*) illustrates a case where a base station has one or two transmit antennas, and FIG. 7(*b*) illustrates a case where a base station has four transmit antennas. In these two cases, only a reference signal (RS) pattern changes according to the number of transmit antennas, and the same method for configuring a resource unit related to a control channel is applied.

Referring to FIG. 7, the basic resource unit of a downlink control channel is a resource element group (REG). Except for the case of an RS, an REG consists of four neighboring resource elements (REs). Each REG is indicated by bold lines in the figure. A PCFICH includes 4 REGs and a PHICH includes 3 REGs. A PDCCH is configured in a unit of control channel elements (CCEs), and one CCE includes 9 REGs.

A UE is configured to check $M^{(L)}(\geq L)$ CCEs which are consecutive or arranged according to a specific rule, in order to check whether or not a PDCCH consisting of L CCEs is transmitted thereto. The value of L which the UE must consider in receiving the PDCCH may be greater than 1. CCE sets that the UE must check to receive a PDCCH are called a search space. For example, an LTE system defines the search space as shown in Table 3 below.

TABLE 3

| Type | Search space $S_k^{(L)}$ Aggregation level Z | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Herein, the CCE aggregation level L denotes the number of CCEs constituting a PDCCH, $S_k^{(L)}$ denotes the search space of CCE aggregation level L, $M^{(L)}$ denotes the number of candidate PDCCHs that need to be monitored in the search space of the aggregation level L.

The search space may be divided into a UE-specific search space, in which only a specific UE is allowed to perform access, and a common search space, in which all UEs in a cell are allowed to perform access. A UE monitors common search spaces corresponding to CCE aggregation levels 4 and 8 and UE-specific search spaces corresponding to CCE aggregation levels 1, 2, 4 and 8. A common search space may overlap a UE-specific search space.

In a PDCCH search space assigned to a UE for each CCE aggregation level value, the location of the first CCE (a CCE having the lowest index) changes in each subframe depending on the UE. This is called PDCCH search space hashing.

CCEs may be distributed over a system band. More specifically, a plurality of logically consecutive CCEs may be input to an interleaver, which functions to mix the input CCEs on an REG-by-REG basis. Thereby, frequency/time resources constituting one CCE may be physically distributed in the whole frequency/time domain within a control region of a subframe. In other words, interleaving is performed on the REG-by-REG basis although a control channel is configured on the CCE-by-CCE basis. Thereby, frequency diversity and interference randomization gain may be maximized.

Figure 8:
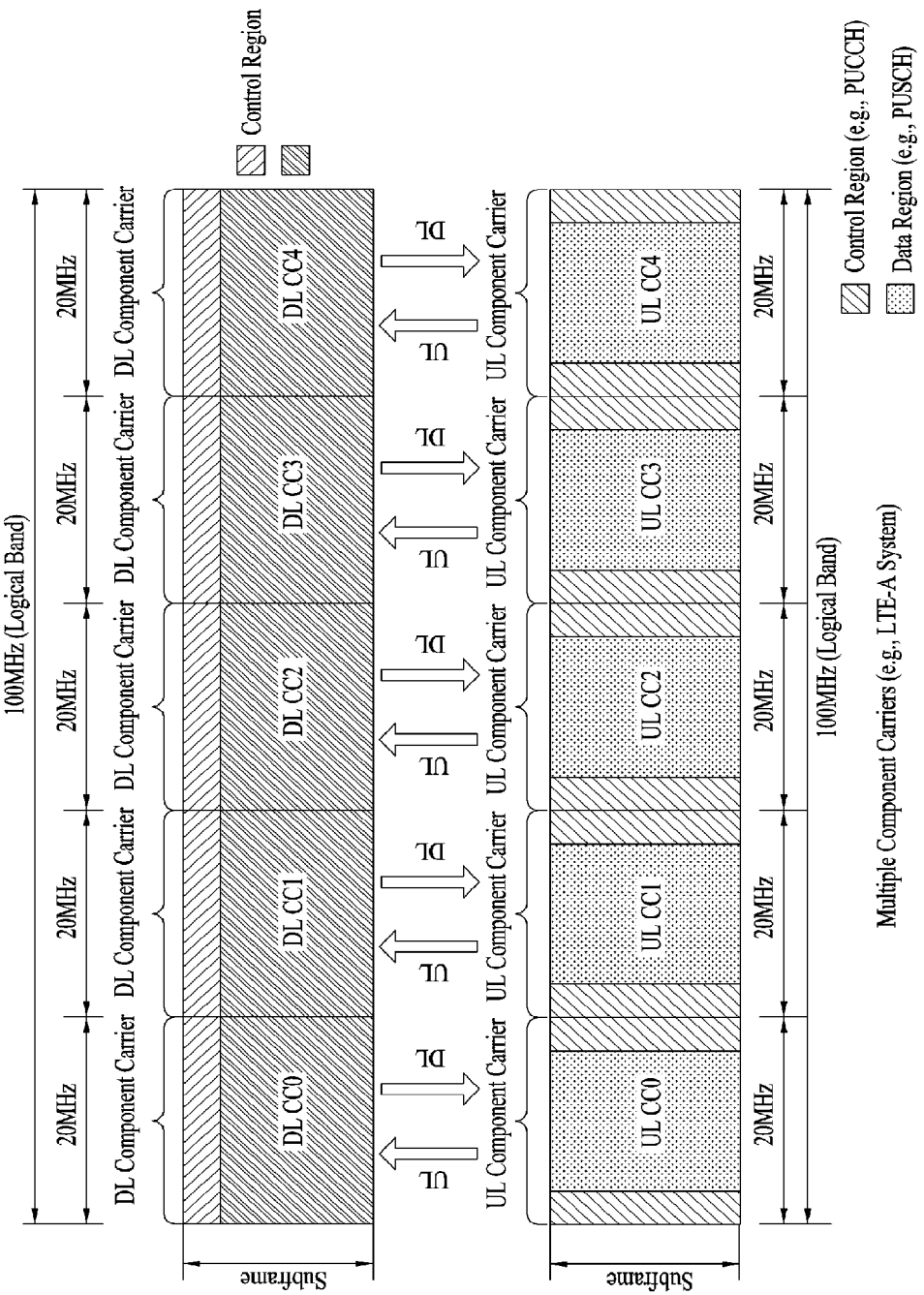
FIG. 8 illustrates a carrier aggregation (CA) communication system.

FIG. 8 illustrates a carrier aggregation (CA) communication system.

Referring to FIG. 8, a plurality of UL/DL component carriers (CCs) may be collected to support a wider UL/DL bandwidth. The term "component carrier (CC)" may be replaced with another equivalent term (e.g., carrier, cell, etc.). CCs may or may not be adjacent to each other in the frequency domain. The bandwidth of each CC may be independently determined. Asymmetric carrier aggregation in which the number of UL CCs differs from that of DL CCs is also possible. Meanwhile, control information may be configured to be transmitted and received through a specific CC. This specific CC may be referred to as a primary CC (or an anchor CC), and the other CCs may be referred to as secondary CCs.

When cross-carrier scheduling (or cross-CC scheduling) is applied, a PDCCH for DL assignment may be transmitted on DL CC #0, and a corresponding PDSCH may be transmitted on DL CC #2. To ensure cross-CC scheduling, a carrier indicator field (CIF) may be introduced. In the PDCCH, presence of CIF may be semi-statically and UE-specifically (or UE group-specifically) indicated through higher layer signaling (e.g., RRC signaling). A bassline for PDCCH transmission is summarized below.

CIF Disabled: A PDCCH on a DL CC is assigned a PDSCH resource on the same DL CC or a PUSCH resource on one linked UL CC.
    No CIF
    Identical to LTE PDCCH structure (the same coding, same CCE-based resource mapping) and DCI format
    CIF Enabled: A PDCCH on a DL CC can be assigned a PDSCH or PUSCH resource on a specific DL/UL CC among a plurality of aggregated DL/UL CCs, using a CIF
    An extended LTE DCI format having a CIF
    The CIF (when configured) is a fixed x-bit field (e.g., x=3)
    The location of the CIF (when configured) is fixed irrespective of the size of the DCI format.
    a Reusing the LTE PDCCH structure (the same coding and same CCE-based resource mapping)

When a CIF is present, a base station may assign a PDCCH monitoring DL CC set to lower BD complexity on the UE. The PDCCH monitoring DL CC set includes at least one DL CC which is a part of all aggregated DL CCs, and the UE detects/decodes a PDCCH only on the at least one DL CC. That is, if the base station schedules a PDSCH/PUSCH for the UE, the PDCCH is transmitted through only the PDCCH monitoring DL CC set. The PDCCH monitoring DL CC set may be configured in a UE-specific, UE-group-specific or cell-specific manner. The term "PDCCH monitoring DL CC" may be replaced with another equivalent term such as "monitoring carrier" and "monitoring cell". In addition, a CC aggregated for the UE may be expressed as an equivalent term such as "serving CC," "serving carrier," and "serving cell".

Figure 9:
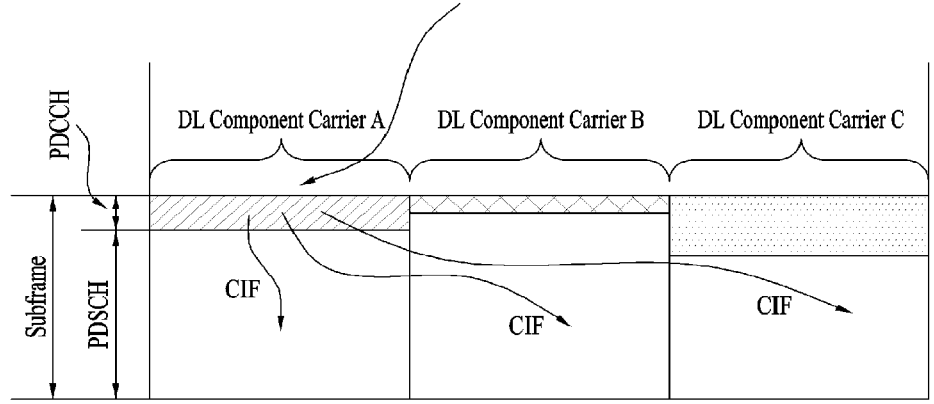
FIG. 9 illustrates a scheduling operation in the case where a plurality of carriers is aggregated.

FIG. 9 illustrates a scheduling operation in the case where a plurality of carriers is aggregated. It is assumed that 3 DL CCs have been aggregated. It is also assumed that DL CC A is configured as a PDCCH monitoring DL CC. DL CCs A to C may be referred to as serving CCs, serving carriers, serving cells, or the like. If the CIF is disabled, each DL CC may transmit only a PDCCH for scheduling the PDSCH thereof without a CIF according to the LTE PDCCH configuration. On the other hand, if the CIF is enabled by UE-specific (or UE-group-specific or cell-specific) higher layer signaling, not only a PDCCH for scheduling the PDSCH of DL CC A but also a PDCCH for scheduling the PDSCH of another CC may be transmitted on DL CC A (a monitoring DL CC) using the CIF. In this case, a PDCCH is not transmitted on DL CC B/C, which is not configured as a PDCCH monitoring DL CC. Accordingly, DL CC A (a monitoring DL CC) must include a PDCCH search space related to DL CC A, a PDCCH search space related to DL CC B and a PDCCH search space related to DL CC C. In this specification, it is assumed that a PDCCH search space is defined for each carrier.

As described above, LTE-A considers using the CIF in a PDCCH to perform cross-CC scheduling. Whether the CIF is used (namely, a cross-CC scheduling mode or non-cross-CC scheduling mode is supported) and switching between the modes may be semi-statically/UE-specifically configured through RRC signaling. After being subjected to the RRC signaling process, the UE may recognize whether the CIF is used in a PDCCH that is to be scheduled therefor.

Figure 10:
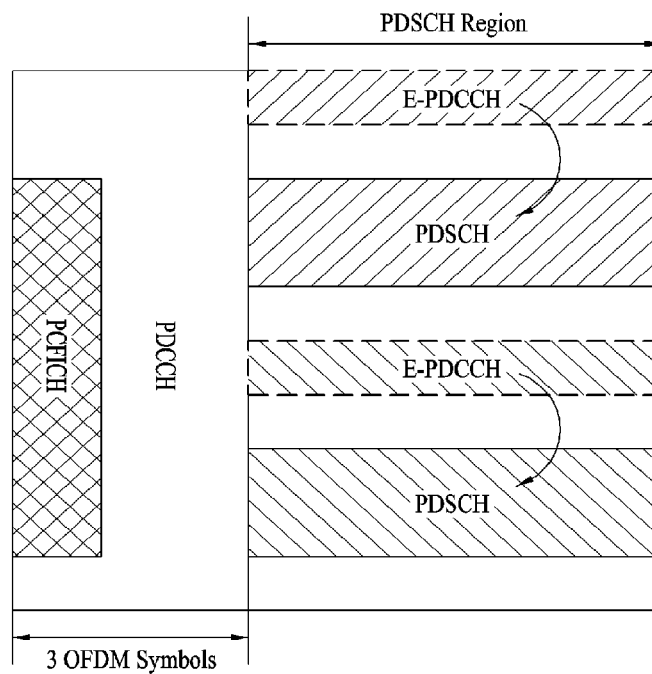
FIG. 10 illustrates an EPDCCH and a PDSCH scheduled by the EPDCCH.

FIG. 10 illustrates an EPDCCH and a PDSCH scheduled by the EPDCCH.

Referring to FIG. 10, for the EPDCCH, a part of the PDSCH region for transmitting data may be generally defined and used. A UE must perform blind decoding to detect presence of an EPDCCH thereof. The EPDCCH performs the same scheduling operation (i.e., controlling a PDSCH and a PUSCH) as performed by the legacy PDCCH, but may increase complexity when the number of UEs accessing a node such as the RRH since the number of EPDCCHs assigned in the PDSCH region increases and thus the number of times of blind decoding which a UE needs to perform increases.

Hereinafter, cooperative multipoint transmission/reception (CoMP) will be described.

Systems after LTE-A consider introducing a method to improve system performance by enabling cooperation among multiple cells. This method is called cooperative multipoint transmission/reception (CoMP). CoMP refers to a communication scheme in which two or more base stations, access points or cells cooperate in order to smoothly communicate with a specific UE. In the present invention, the terms base station, access point, and cell may have the same meaning.

Generally, in a multi-cell environment where the frequency reuse factor is 1, performance and average sector throughput of a UE positioned at a cell boundary may be lowered due to inter-cell interference (ICI). In order to attenuate such ICI, the legacy LTE system uses a simple passive technique such as fractional frequency reuse (FFR) through UE-specific power control to ensure that a UE positioned at the cell boundary exhibits proper throughput performance in an environment where the UE is subjected to interference. However, it may be more preferable to attenuate ICI or reuse ICI as a signal desired by the UE than to lower frequency resource use per cell. To achieve this object, a CoMP transmission technique may be applied.

Figure 11:
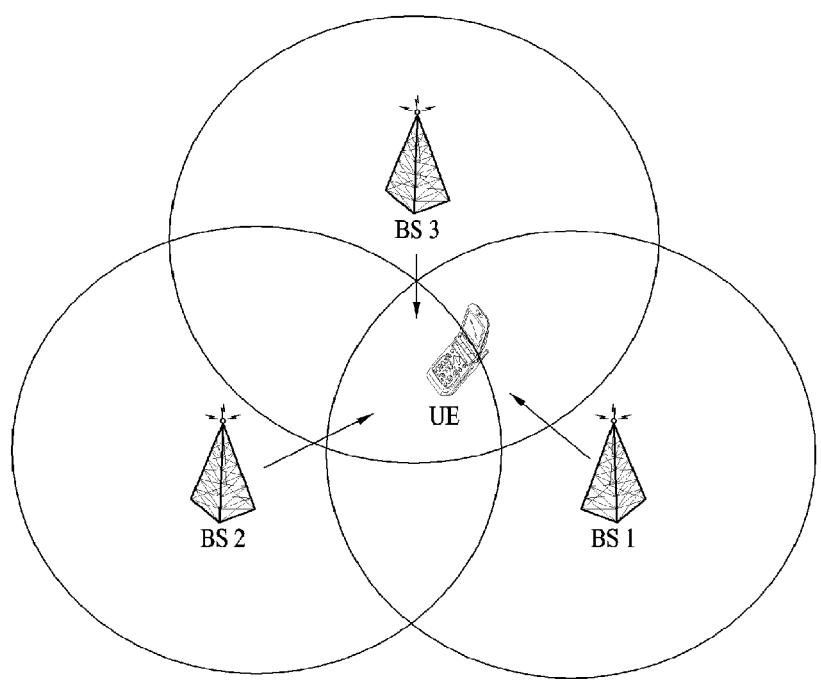
FIG. 11 shows an example of CoMP operation.

FIG. 11 shows an example of CoMP operation. Referring to FIG. 11, a wireless communication system includes a plurality of bass stations BS1, BS2 and BS3 and a UE which perform CoMP, the base stations BS1, BS2 and BS3 performing CoMP may cooperate, thereby efficiently transmitting data to the UE. CoMP may be divided into two techniques depending on whether or not data is transmitted from a base station performing CoMP:

CoMP joint processing (CoMP-JP)

CoMP cooperative scheduling (CoMP-CS)/cooperative beamforming (CB)

In CoMP-JP, base stations performing CoMP transmit data to one UE simultaneously, and the UE improves reception performance by combining signals from the base stations. That is, according to the CoMP-JP technique, each point (base station) in a CoMP cooperation unit may use data. The CoMP cooperation unit refers to a set of base stations used for a cooperative transmission scheme. The JP scheme may be divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may transmit data to a single UE simultaneously. With the joint transmission technique, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a specific time, while the other transmission points in the CoMP cooperation unit do not transmit data to the UE at this time. A transmission point to transmit data to a UE may be dynamically selected.

On the other hand, when CoMP-CS is used, data is transmitted from one base station to a UE at a certain moment, and scheduling or beamforming is performed such that interference with the other base stations is minimized. That is, when the CS/CB technique is used, CoMP cooperation units may cooperatively perform beamforming for data transmission to a single UE. While data is transmitted to the UE only from a serving cell, user scheduling/beamforming may be determined through coordination among cells in the CoMP cooperation unit.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

JR refers to a technique of a plurality of reception points receiving a signal transmitted through a PUSCH. The CS/CB refers to a technique of only one point receiving a PUSCH, and user scheduling/beamforming is determined by coordination among the cells of a CoMP unit.

Hereinafter, interference between multiple cells will be described.

When coverages of two base stations (e.g., BS #1 and BS #2) partially overlap as in the case where the two base stations are disposed adjacent to each other, a UE served by one base station may be subjected to interference of a strong DL signal from the other base station. If inter-cell interference occurs as above, the interference may be attenuated through inter-cell cooperative signaling between the two base stations. In the description of various embodiments of the present invention given below, it is assumed that signal transmission and reception are smoothly performed between two base stations interfering with each other. For example, it is assumed that there is a wired/wireless link (e.g., a backhaul link or Un interface) on which transmission conditions such as a transmission bandwidth or time delay between the base stations are good and thus the reliability of transmission and reception of a cooperative signal between the base stations is high. It may also be assumed that time synchronizations is established between the two base stations within a tolerance (e.g., the boundaries of DL subframes of two base stations interfering with each other are aligned) or that an offset between subframe boundaries of the two base stations is clearly recognized by the two base stations.

Referring back to FIG. 11, BS #1 may be a macro eNB serving a wide area with a high transmit power, and BS #2 may be a micro eNB (e.g., a pico eNB) serving a narrow area with a low transmit power. As illustrated in FIG. 11, if a UE located in a cell boundary area of BS #2 and served by BS #2 is subjected to strong interference from BS #1, effective communication may not be performed without proper inter-cell cooperation.

In particular, inter-cell interference is very likely to occur when a large number of UEs is allowed to be connected to BS #2 serving as a micro eNB having low power in order to distribute service load of BS #1 serving as a macro eNB. For example, when the UE attempts to select a serving base station, the UE may calculate and compare receive powers of DL signals from the base stations by adding a predetermined coordination value (a bias value) to the receive power from the micro eNB without adding a coordination value to the receive power from the macro cNB. Then, the UE may select a base station providing the highest DL transmit power as a serving base station. Thereby, a larger number of UEs may be allowed to be connected to the micro eNB. The micro eNB may be selected as a serving base station even though the DL signal received by the UE from the macro eNB is much stronger than the DL signal from the micro eNB. In this case, the UEs connected to the micro eNB may experience strong interference from the macro eNB. Thereby, UEs located at the coverage boundary of the micro eNB may not correctly operate due to strong interference from the macro eNB if separate inter-cell cooperation is not provided.

To ensure effective operation even if inter-cell interference exists, proper cooperation should be established between two base stations applying inter-cell interference to each other, and a signal for enabling such cooperation may be transmitted and received via a link between the two base stations. In this case, if inter-cell interference occurs between the macro eNB and the micro eNB, the macro eNB may control inter-cell cooperative operation, and the micro eNB may properly operate according to a cooperative signal delivered from the macro eNB.

The inter-cell interference situation described above is simply illustrative. It is apparent that the embodiments described in the present invention are also applied to other situations where inter-cell interference occurs (for example, when inter-cell interference occurs between a CSG type HeNB and an OSG type macro eNB, when the micro eNB interferes with the macro eNB, or when inter-cell interference exists between micro eNBs or between macro eNBs).

Figures 12, 13:
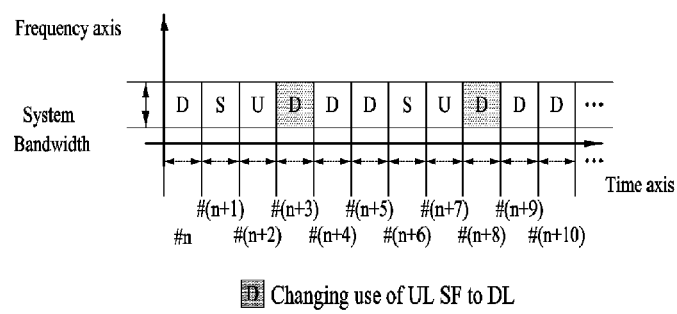
FIG. 12 illustrates dynamically switching the usage of a radio resource in the environment of a TDD system.
FIG. 13 shows a format defined for the purpose of transmission of change-of-use information (e.g., a change-of-use indicator) according to an embodiment of the present invention.

FIG. 12 illustrates a case where a specific cell changes a part of UL resources (i.e., UL SFs) for use in DL communication in a TDD system as downlink load increases in the system.

In FIG. 12, a UL/DL configuration established through an SIB is assumed to be UL/DL #1 (i.e., DSUUDDSUUD), UL SF #(n+3) and UL SF #(n+8) are changed for downlink communication through a predefined signal (e.g., a physical/higher layer signal or a system information signal).

The present invention proposes a method for efficiently transmitting/receiving change-of-use information (e.g., a change-of-use indicator) when multiple cells dynamically change use of a radio resource according to the system load applied thereto as described above.

Herein, the change-of-use information (e.g., a change-of-use indicator) may be transmitted through i) a physical downlink control channel (PDCCH) and/or ii) an enhanced PDCCH (EPDCCH) that is transmitted in the physical downlink shared channel (PDSCH) region, and/or iii) a physical broadcast channel (PBCH) (e.g., MIB), and/or iv) a higher layer signal (e.g., RRC, MAC), and/or v) a system information block (SIB).

The PDSCH region is defined as a region consisting of the OFDM symbols configuring a subframe except a few leading OFDM symbols of the subframe which are used for (conventional) PDCCH transmission. The present invention is also applicable to the case where there are no OFDM symbols which are used for PDCCH transmission and thus all OFDM symbols of a subframe are designated and used as a PDSCH region.

Hereinafter, for simplicity, the proposed method will be described based on the 3GPP LTE system. However, the proposed method is also applicable to systems other than the 3GPP LTE system.

Embodiments of the present invention are applicable in the case where a resource on a specific cell (or a component carrier (CC)) is dynamically changed according to the load applied to the system in an environment where a carrier aggregation (CA) technique is employed.

Embodiments of the present invention are also applicable in the case where use of a radio resource is dynamically changed in a TDD system, FDD system or TDD/FDD-aggregated system.

Additionally, embodiments of the present invention are also applicable in the case where change-of-use information (e.g., a change-of-use indicator) is transmitted in the form of i) a UE-specific signal, and/or ii) a cell-specific signal and/or iii) a UE group-specific signal. Herein, the change-of-use information may be transmitted through the UE-specific search space (USS) and/or a common search space (CSS).

For example, transmitting change-of-use information (e.g., a change-of-use indicator) through the CSS with the CA technique applied may be interpreted as meaning that the change-of-use information is received in the form of a predefined DCI format through a primary cell (or a primary CC) on which the CSS is valid. In another example, if the CA technique is applied, and the change-of-use information is set to be transmitted through a PDCCH (or predefined DCI) in the CSS (wherein the PDCCH (or predefined DCI) is decoded (or detected) through, for example, a (UE group-specific or UE-specific) RNTI which is additionally predefined), change-of-use information about the secondary cells (or secondary CCs) may also be transmitted through the PDCCH (or predefined DCI) related to transmission of the change-of-use information transmitted in the CSS on the primary cell (or primary CC).

Hereinafter, for simplicity of description, it is assumed that cells dynamically change use of an existing resource according to load applied thereto in a TDD system environment.

Description is given below of configuration of the proposed change-of-use information (e.g., a change-of-use indicator). According to an embodiment of the present invention, the change-of-use information may be set to be signaled to a UE by a base station using a predefined format. For example, change-of-use information may be transmitted over a physical control channel, physical data channel, higher layer signal, or system information transmission channel, and a UE may receive the change-of-use information based on a predefined RNTI (e.g., a new RNTI defined to receive the change-of-use information or an existing RNTI used to receive a specific channel (information)).

Further, change-of-use information (e.g., a change-of-use indicator) may be transmitted based on a predefined periodicity, or the same change-of-use information (e.g., the same change-of-use indicator) may be repeatedly transmitted a predetermined number of times based on a specific periodicity or within a specific period such that the information is transmitted with a high reliability.

The predefined format may be defined such that change-of-use information (e.g., change-of-use indicators) about not only one specific serving cell (or serving transmission point (hereinafter, serving TP)) but also multiple cells (or transmission points (hereinafter, TPs)) is transmitted. Such format may be particularly effective in signaling change-of-use information (e.g., change-of-use indicators) about multiple cells to a specific UE (e.g., CoMP UE) when cells (or TPs) participating in CoMP operation dynamically change use of a radio resource.

The format may also be applied to transmit change-of-use information (e.g., change-of-use indicators) about multiple cells (e.g., SCells) in a situation in which the multiple cells (or CCs) are configured through the CA technique. For example, information (e.g., UL-DL (re)configuration) about use of subframes for multiple cells (TPs) may be set to be signaled in the form of UL-DL configuration information on a serving cell (e.g., a PCell or scheduling cell) and an offset value for the UL-DL configuration of the serving cell. In the case where UL-DL configuration information about two cells (TPs) is transmitted, if UL-DL configuration #0 (i.e., DSUUUDSUUU) and an offset value of 2 for the serving cell (or serving TP) are signaled, the UL-DL configuration for the other cells (or the other TPs) may be considered to be UL-DL configuration #2 (i.e., DSUDDDSUDD). For cells (or TPs) whose subframe usage information is not changed, specific predefined bits (or UL-DL configuration information about the cells or TPs on an SIB) may be transmitted. Further, the number of the specific bits may be smaller than or equal to that of the bits needed to signal changed usage information on a specific cell (or specific TP).

Accordingly, a UE receiving the change-of-use information may effectively perform, for each cell, i) channel state measurement (e.g., RRM/RLM/CSI), ii) monitoring of a control channel (e.g., an EPDCCH/PDCCH), or iii) transmission/reception of a data channel (e.g., PSUCH, PDSCH), based on a predefined rule. The subframes in which the UE performs measurement of channel state information (e.g., RRM/RLM/CSI) for individual cells or the subframes in which the UE monitors a control channel (e.g., EPDCCH/PDCCH) may be limited to i) a subframe set which each cell uses for downlink, ii) a subframe set which cells participating in CoMP operation use for downlink in common, or iii) a predefined (DL) subframe set (e.g., a DL subframe set (i.e., SF #0, #1, #5, #6) use of which cannot be changed through transmission of PSS/SSS/PBCH).

The change-of-use information (e.g., change-of-use indicator) about the respective cells (or TPs) may include not only information (e.g., UL-DL (re)configuration) about use of the subframes but also at least one of i) physical/virtual cell (or TP) identifier information. ii) special subframe configuration information, iii) identifier information about UEs for which dynamic change is applied, iv) group identifier information about a specific UE group for which dynamic change is applied, v) dynamic change configuration information about individual cells (or TPs), vi) QCL configuration information about individual cells (or TPs), vii) non-zero power CSI-RS configuration information, viii) zero power CSI-RS configuration information, ix) IMR configuration information, x) information defined in association with a PQI field. Herein, the dynamic change configuration information about individual cells (or TPs) may include, for example, information indicating whether or not a specific reference signal (e.g., CRS, CSI-RS) is transmitted in subframes whose usage has changed and/or TM configuration information (or transmission technique configuration information). In addition, the information defined in association with the PQT field may include at least a part or all of i) the number of CRS antenna ports for PDSCH RE mapping (crs-PortsCount-11) information, ii) CRS frequency shift for PDSCH RE mapping (crs-FreqShift-r11) information, iii) MBSFN subframe configuration for PDSCH RE mapping information (mbsfn-SubframeConfig-List-r11), iv) zero power CSI-RS resource configuration for PDSCH RE mapping information (csi-RS-ConfigZPId-r11), v) PDSCH starting position for PDSCH RE mapping information (pdsch-Start-r11), vi) CSI-RS resource that is quasi co-located with the PDSCH antenna port information (qcl-CSI-RS-ConfigNZPId-r11), and vii) configuration information related to RE mapping of EPDCCH and EPDCCH antenna port Quasi co-location.

FIG. 13 shows a format defined for the purpose of transmission of change-of-use information (e.g., a change-of-use indicator) according to an embodiment of the present invention. While FIG. 13 illustrates a format for transmission of change-of-use information about arbitrary cells, a format for transmission of change-of-use information about arbitrary TPs may also be applied in the same manner.

In FIG. 13, it is assumed that change-of-use information about M cells (or TPs) is transmitted through the format of the change-of-use information. Corresponding information (i.e., information about the number of cells (or TPs) about which the change-of-use information is currently transmitted through one piece of change-of-use information or information about the number of fields which are used for transmission of change-of-use information among the fields in one change-of-use information format) may be transmitted to a UE by a base station through one of a physical control channel (e.g., EPDCCH/PDCCH), a physical data channel (e.g., PDSCH), a higher layer signal (e.g., RRC/

MAC) and a system information transmission channel (e.g., PBCH/SIB/Paging). Alternatively, in the case where change-of-use information (e.g., change-of-use indicators) about multiple cells (or TPs) is transmitted based on a predefined format, the base station may pre-deliver specific information states about multiple cells (or TPs) to the UE through signaling (e.g., RRC signaling) and establish a configuration such that the UE may recognize cell-specific information of a cell (or TP-specific information of a TP) associated with change-of-use information (e.g., a change-of-use indicator) according to a predefined rule.

Further, in the case where the multiple cells (or CCs) are configured through the CA technique, the same operation as above may be performed when change-of-use information (e.g., change-of-use indicators) about multiple cells is transmitted.

For example, cell-specific (or TP-specific) information may include information about at least one of i) a physical/virtual cell (or TP) identifier associated with change-of-use information (e.g., a change-of-use indicator) at a specific position in a predefined format, ii) QCL configuration of the cell (or TP), iii) non-zero power CSI-RS configuration of the cell (or TP), iv) zero power CSI-RS configuration of the cell (or TP), v) IMR configuration zero power CSI-RS configuration of the cell (or TP), vi) PDSCH/(E)PDCCH rate-matching configuration of the cell (or TP) and vii) information defined in association with a PQI field. Herein, the information defined in association with the PQI field may include, for example, at least a part or all of i) the number of CRS antenna ports for PDSCH RE mapping (crs-PortsCount-11) information, ii) CRS frequency shift for PDSCH RE mapping (crs-FreqShift-r11) information, iii) MBSFN subframe configuration for PDSCH RE mapping information (mbsfn-SubframeConfigList-r11), iv) zero power CSI-RS resource configuration for PDSCH RE mapping information (csi-RS-ConfigZPId-11), v) PDSCH starting position for PDSCH RE mapping information (pdsch-Start-r11), vi) CSI-RS resource that is Quasi co-located with the PDSCH antenna ports information (qcl-CSI-RS-ConfigNZPId-r11), vii) configuration information related to RE mapping of EPDCCH and EPDCCH antenna port Quasi co-location.

In addition, a relationship between cell-specific (or TP-Specific) information states defined through change-of-use information (e.g., change-of-use indicators) in a predefined format and additional signaling (e.g., RRC signaling) may be determined based on a predefined rule. For example, M pieces of change-of-use information in the predefined format are transmitted, the base station may configure or signal M cell-specific (or TP-specific) information states for the UE such that change-of-use information is sequentially mapped one-to-one to cell-specific (or TP-specific) information. That is, the base station may cause the J-th change-of-use information to be associated with the J-th cell-specific (or TP-specific) information state.

In the case where change-of-use information (e.g., change-of-use indicators) about M (a natural number) cells (or TPs) is transmitted based on a predefined format, the number of pieces of cell-specific (or TP-specific) information delivered to the UE by the base station may be defined as being greater than or equal to M. Herein, if change-of-use information items (e.g., change-of-use indicators) about M cells (or TPs) are transmitted based on a predefined format, but cell-specific (or TP-specific) information signaled to the UE by the base station is defined by information states the number of which is less than M, this means that some cells (or TPs) share the same cell-specific (or TP-specific) information. Some cells (or TPs) may share the same cell-specific information even in the case where the number of pieces of change-of-use information substantially transmitted at a time is greater than that of pieces of cell-specific (or TP-specific) information signaled to the UE by the base station.

On the other hand, if change-of-use information (e.g., change-of-use indicators) about M cells (or TPs) is transmitted based on a predefined format, the number of pieces cell-specific (or TP-specific) information signaled to the UE by the base station may be defined as being greater than M. This means that some cells (or TPs) share the same change-of-use information (or UL-DL configuration) (which is similar to, for example, a case in which a cell clustering interference mitigation scheme is applied). This is because non-zero power CSI-RS configuration information for each cell (or TP) may be differently configured for some cells to ensure RRM/RLM/CSI measurement of the UE according to each cell (or TP) or be differently configured for all cells, and specific non-zero power CSI-RS information may implicitly indicate one specific cell (or TP), in the case where the some cells (or TPs) share the same change-of-use information.

That is, if the number of pieces of cell-specific (or TP-specific) information signaled to the UE by the base station through a predefined format is greater than that of pieces of change-of-use information (e.g., M), this means that the number of pieces of non-zero power CST-RS information associated with the pieces of configured cell-specific (or TP-specific) information the number of which is relatively large is greater than that of pieces of change-of-use information. Moreover, this means that the number of cells (or TPs) distinguished by different pieces of non-zero power CSI-RS configuration information is larger than that of pieces of change-of-use information, and ultimately means that some cells (or TPs) share the same change-of-use information (or UL-DL configuration).

In addition, the scheme of defining the number of pieces of change-of-use information substantially transmitted at a time as being greater than M when change-of-use information about M cells is transmitted based on a predefined format as described above may also be applied when the number of pieces of change-of-use information (e.g., change-of-use indicators) substantially transmitted at a time is less than that of pieces of cell-specific (or TP-specific) information signaled to the UE by the base station.

A field (or bit) indicating state information corresponding to cell-specific (or TP-specific) information associated with specific change-of-use information (e.g., change-of-use indicator) in a predefined format through which change-of-use information (e.g., change-of-use indicators) about multiple cells (or TPs) may be additionally defined. Such additional definition for the change-of-use information is effective in (flexibly) designating a relation (e.g., a one-to-many relation or many-to-one relation) between two kinds of information when the number of pieces of change-of-use information transmitted through a predefined format is not equal to that of cell-specific (or TP-specific) information states defined through additional signaling (e.g., RRC signaling).

Additionally, a rule under which the base station pre-signals multiple cell-specific (or TP-specific) information states to the UE and causes cell-specific (or TP-specific) information of a cell (or TP) associated with change-of-use information (e.g., a change-of-use indicator) to be recognized according to a predefined rule may be interpreted as defining UL-DL configuration information according to each PQI state (PQI field value) or as defining UL-DL configuration information according to each PQI state (PQI field 각) and each QCL information.

In addition, in the case where a format predefined for transmitting change-of-use information (e.g., change-of-use indicator) has a fixed length $L_{Total}$ (the format may carry, for example, N fixed pieces of UL-DL (re)configuration information (wherein N is a natural number) and have ($L_{Total}$N*S) extra bits (wherein, S denotes bits (e.g., 3 bits) defined to express one UL-DL configuration information (related to one specific cell (or TP)))), if the number of cells/TPs/CCs for which subframe usage is actually changed is less than N, i) an unused UL-DL (re)configuration information field, ii) a UL-DL (re)configuration information field which is not associated with a cell/TP/CC-specific information state, or iii) a UL-DL (re)configuration information field which is not associated with a specific cell/TP/CC may be produced along with the ($L_{Total}$-N*S) extra bits.

In addition, in the case where a format predefined for transmitting change-of-use information (e.g., change-of-use indicator) (i.e., a format having length $L_{Total}$) can carry N fixed UL-DL (re)configuration information (wherein, N is a natural number) (e.g., LTotal is N*S, wherein S denotes bits (e.g., 3 bits) defined to express one UL-DL configuration information item (related to one specific cell (or TP))), if the number of cells/TPs/CCs for which subframe usage is actually changed is less than N, i) an unused UL-DL (re)configuration information field, ii) a UL-DL (re)configuration information field which is not associated with a cell/TP/CC-specific information state, or iii) a UL-DL (re) configuration information field which is not associated with a specific cell/TP/CC may be produced. For example, when a format predefined for transmission of change-of-use information (e.g., a change-of-use indicator) has length $L_{Total}$ corresponding to 8 bits and UL-DL (re)configuration information about a one specific cell (or TP) is defined in 3 bits, if change-of-use information (e.g., change-of-use indicator) about two (i.e., M is set to 2) cells (or TPs) is transmitted in the format related to transmission of the change-of-use information (e.g., change-of-use indicator), the total number of bits not actually used in the format is 2. In another example, when a format predefined for transmission of change-of-use information (e.g., a change-of-use indicator) has length $L_T$r corresponding to 8 bits, and UL-DL (re) configuration information about one specific cell (or TP) is defined in 3 bits, if change-of-use information (e.g., a change-of-use indicator) about one cell (or TP) (M is set to 1) is transmitted in the format related to transmission of the change-of-use information (e.g., change-of-use indicator), the number of bits which are not actually used in the format is 5.

Therefore, according to this embodiment, UL-DL configuration information on an SIB of a cell/TP/CC whose usage information is not changed may be inserted in i) an unused UL-DL (re)configuration information field, ii) a UL-DL (re)configuration information field which is not associated with a cell/TP/CC-specific information state, iii) a UL-DL (re)configuration information field which is not associated with a specific cell/TP/CC, or iv) the ($L_{Total}$-N*S) extra bits.

Alternatively, a predefined specific bit (or value) or information on a predefined specific state may be inserted in i) an unused UL-DL (re)configuration information field, ii) a UL-DL (re)configuration information field which is not associated with a cell/TP/CC-specific information state, iii) a UL-DL (re)configuration information field which is not associated with a specific cell/TP/CC, or iv) the ($L_{Total}$-N*S) extra bits. Accordingly, causing a predefined specific bit/ value or information on a predefined specific state to be inserted in an unused field and/or the ($L_{Total}$-N*S) extra bits in a format indicating change-of-use information may be viewed as meaning that the UE uses (interprets) the field and/or ($L_{Total}$-N*S) extra bits as elements for zero padding or virtual CRC.

The length of bits (a field) used for zero padding or virtual CRC in a predefined format used for transmission of change-of-use information (e.g., a change-of-use indicator) may be derived from "the entire length of the format $L_{Total}$–FLOOR (the entire length of the format $L_{Total}$/a bit length S defined to express one piece of UL-DL configuration information (related to one specific cell (or TP)))*the bit length S defined to express one piece of UL-DL configuration information (related to one specific cell (or TP))". Herein, floor(X) may be defined as an integer which is not greater than X (i.e., a discarding operation). That is, the "the entire length of the format $L_{Total}$–FLOOR (the entire length of the format $L_{Total}$/a bit length S defined to express one piece of UL-DL configuration information (related to one specific cell (or TP)))*the bit length S defined to express one piece of UL-DL configuration information (related to one specific cell (or TP))" including the last bit (or LSB) in the format are used in reverse order for zero padding or virtual CRC. For reference, when a specific UE group monitors a format related to transmission of one common change-of-use information item (e.g., a change-of-use indicator) (based on one common RNTI), the rule described above may ensure that bits (or a field) having a common length (or position) are used for zero padding or virtual CRC, regardless of the number of cells to which individual UEs (belonging to the UE group) apply the CA technique.

Alternatively, UL-DL configuration information on an SIB of a serving cell/TP/CC (e.g., PCell, scheduling Cell) transmitting the format may be inserted in i) an unused UL-DL (re)configuration information field, ii) a UL-DL (re)configuration information field which is not associated with a cell/TP/CC-specific information state, iii) a UL-DL (re)configuration information field which is not associated with a specific cell/TP/CC, or iv) the ($L_{Total}$-N*S) extra bits.

In addition, the UE may apply specific change-of-use information (e.g., a specific change-of-use indicator) to a cell/TP/CC which is QCL with non-zero power CST-RS configuration/CRS configuration associated with the specific change-of-use information (namely, with respect to PDSCH in view of blind decoding for downlink) when the UE receives the change-of-use information. That is, the UE MAY derive a cell/TP/CC to which the specific change-of-use information (e.g., change-of-use indicator) is applied from QCL information of a specific reference signal. Herein, the QCL information of the specific reference signal may be interpreted as being an indicator indicating a cell/TP/CC to which the specific change-of-use information is applied.

Herein, non-zero power CSI-RS/CRS configuration information associated with the specific change-of-use information (e.g., change-of-use indicator) may be configured through a cell-specific (or TP-specific) information state which is defined through additional signaling. In particular, to ensure RRM/RLM/CSI measurement of the UE for respective cells (or TPs), all or some non-zero power CSI-RS configuration information for the respective cells (or TPs) may be differently configured. Accordingly, the specific non-zero power CSI-RS information may implicitly indicate one specific cell (or TP). Additionally, the aforementioned operation is also applicable to PUSCH if a virtual cell ID takes the form of a DM-RS scrambling seed.

As another example, causing the UE to apply specific change-of-use information (e.g., a specific change-of-use indicator) to a cell/TP/CC which is QCL with non-zero power CSI-RS configuration/CRS configuration associated with the information when the UE receives the specific change-of-use information (e.g., change-of-use indicator) may be interpreted as defining UL-DL configuration information for each QCL information or for each QCL information and each PQI state (PQI field value).

Figure 14:
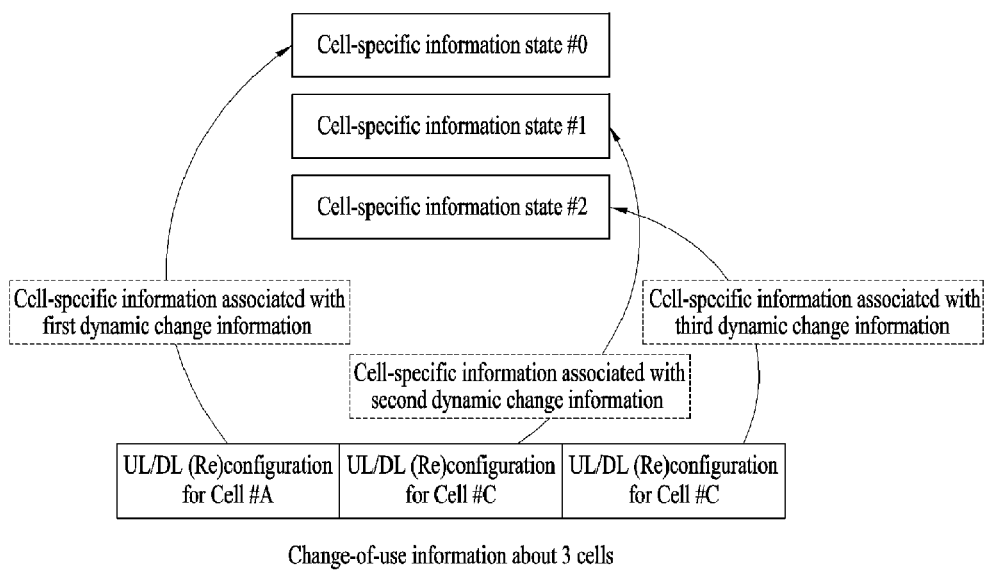
FIGS. 14 to 16 illustrate association configuration between change-of-use information about multiple cells transmitted according to a predefined format and multiple cell-specific information states according to an embodiment of the present invention.
Figure 15:
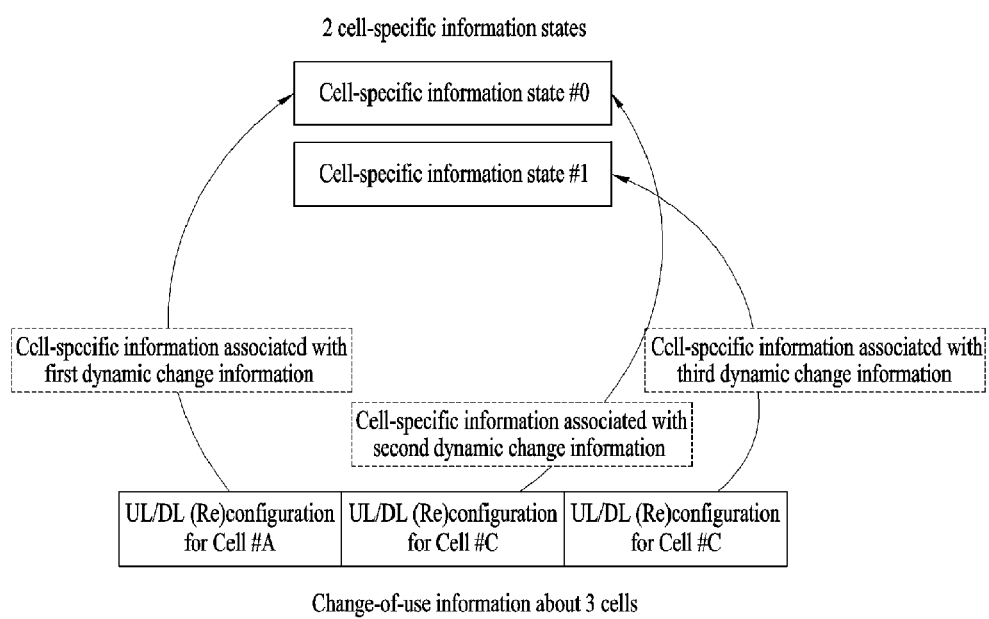
Figure 16:
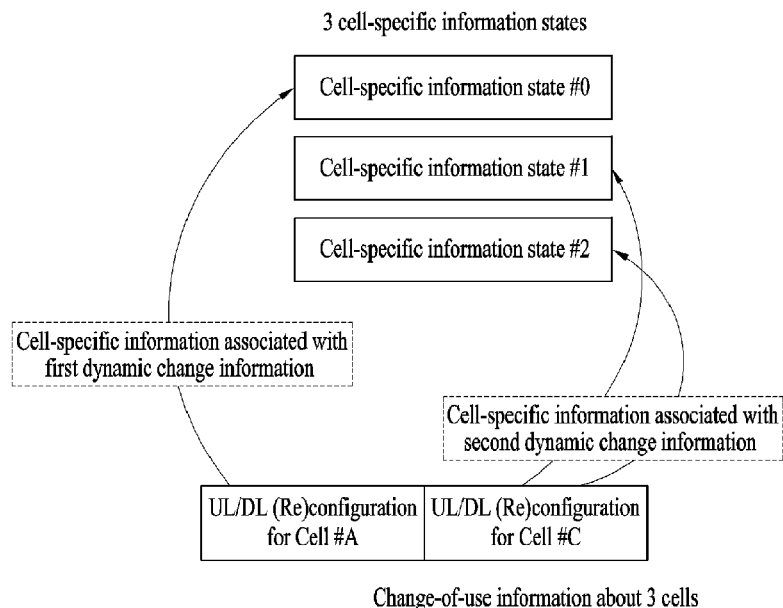

FIGS. 14 to 16 illustrate association configuration between change-of-use information (e.g., change-of-use indicators) about multiple cells transmitted according to a predefined format and multiple cell-specific (or TP-specific) information states defined through an additional signal according to an embodiment of the present invention.

In FIG. 14, it is assumed that change-of-use information about three cells (TPs) is transmitted through a predefined format and that a base station signals three cell-specific (or TP-specific) information states to a UE.

Referring to FIG. 14, UL-DL (re)configuration information about cell (or TP) #A in a predefined format, UL-DL (re)configuration information about cell (or TP) #B, UL-DL (re)configuration information about cell (or TP) #C are configured to be associated with cell-specific (or TP-specific) information state #0, cell-specific (or TP-specific) information state #1 and cell-specific (or TP-specific) information state #2 respectively through sequential one-to-one mapping.

In FIG. 15, it is assumed that change-of-use information about three cells (TPs) is transmitted through a predefined format and that a base station signals two cell-specific (or TP-specific) information states to a UE. That is, the figure illustrates a case where one cell-specific (or TP-specific) information state is applied to a plurality of cells (or TPs) or a plurality of change-of-use information items.

In FIG. 15, for UL-DL (re)configuration information about cell (or TP) #A, #B and #C in a predefined format, a field (or bit) for indicating state information corresponding to cell-specific (or TP-specific) information associated with specific change-of-use information is additionally defined in the predefined format in which change-of-use information about multiple cells (or TPs) is transmitted. Thereby, UL-DL (re)configuration information about cell (or TP) #A is associated with cell-specific (or TP-specific) information state #0, UL-DL (re)configuration information about cell (or TP) #B is associated with cell-specific (or TP-specific) information state #0, and UL-DL (re)configuration information about cell (or TP) #C is associated with cell-specific (or TP-specific) information state #1.

In FIG. 16, it is assumed that change-of-use information (e.g., a change-of-use indicator) about two cells (TPs) is transmitted through a predefined format and that a base station signals three cell-specific (or TP-specific) information states to a UE. That is, the figure illustrates a case where a plurality of cell-specific (or TP-specific) information states is applied to one change-of-use information item. This case may be interpreted as a case where some cells (or TPs) share the same change-of-use information (or UL-DL configuration).

According to another embodiment, UL-DL configuration information may be designated for i) each PQI state (PQI field value) and each QLC information item, for ii) each PQI state (PQI field value), or for iii) each QCL information.

For example, if change-of-use information (e.g., change-of-use indicators) which the base station signals to the UE is transmitted in a fixed resource region on a specific or at a fixed time, large overhead may be caused to the channel.

Further, due to simultaneous transmission of many pieces of change-of-use information (which may increase, for example, a coding rate), reliable transmission/reception of the change-of-use information may not be ensured. In particular, if the change-of-use information is transmitted as UE-specific information rather than cell-specific information, the aforementioned problems may be worsened.

Accordingly, according to this embodiment, change-of-use information (e.g., change-of-use indicators) may be transmitted based on a predefined RNTI in a distributed manner in order to receive i) multiple predefined resource regions, ii) predefined separate time domains, or iii) the change-of-use information on a specific channel. For example, in the case where change-of-use information through the (E)PDCCH (in the form of, for example, to ensure dynamic change, a newly defined DCI format or an existing DCI format), all predefined UL-DL configuration candidates may be arranged such that some candidate information may be transmitted through (E)CCE #A (or (E)CCE set #A), and the other candidate information may be transmitted (E)CCE #B (or (E)CCE set #B).

If the base station configures multiple EPDCCH sets for the UE, (E)CCE #A and (E)CCE #B may be configured to be present in different EPDCCH sets, or may be configured to be present in one predefined EPDCCH set. Similarly, if the base station configures multiple EPDCCH sets for the UE, (E)CCE set #A and (E)CCE set #B may be configured to be present in different EPDCCH sets, or may be configured to be present in one predefined EPDCCH set. Finally, the UE receives change-of-use information by monitoring (E)CCE #A and (E)CCE #B (or (E)CCE set #A and (E)CCE set #B) on the (E)PDCCH.

Further, a resource for receiving change-of-use information (e.g., a change-of-use indicator) on a specific channel may differ between UEs (or UE groups)/cells (or cell groups). Accordingly, the base station may deliver information about a resource on the specific channel on which each UE (or UE group)/cell (or cell group) performs the monitoring operation (or information about UE/cell grouping) to the UE through a predefined signal (e.g., physical layer or higher layer signal).

In addition, the change-of-use information (e.g., change-of-use indicators) transmitted by the base station may not be normally received by the UE due to a bad channel state. In this regard, a response message (e.g., ACK/NACK) for reception of change-of-use information may be additionally defined. For example, the response message (e.g., ACK/NACK) may be transmitted through an uplink control channel resource (PUCCH resource) linked to resources (e.g., (E)CCE #A and (E)CCE #B) which are used when the UE monitors the change-of-use information on a specific channel (e.g., (E)PDCCH) be transmitted through an uplink control channel resource (PUCCH resource) linked to the lowest index (e.g., the lowest (E)CCE index) among the resources which are used when the UE monitors change-of-use information on a specific channel (e.g., (E)PDCCH).

Specifically, if change-of-use information (e.g., change-of-use indicators) is transmitted through L (E)CCEs (wherein, L is a natural number) on the (E)PDCCH, UEs receiving the change-of-use information may be divided into L groups according to a predefined rule. Herein, the UEs may be simply divided into L groups based on values obtained by performing modulo operation on the identifiers (e.g., C-RNTIs) of the UEs using L (namely, based on remainders obtained by dividing the identifiers of the UEs by L) (i.e., 'UE group number=(C-RNTI modulo L)'). Alternatively, in consideration of reception of the changeof-use information, the UEs may be divided into L groups based on values obtained by performing the modulo operation a predefined identifier using L.

UEs corresponding to individual groups transmit response messages for reception of the change-of-use information through uplink control channel resources (PUCCH resources) linked to different (E)CCEs associated the respective groups. That is, if a UE fails to receive the change-of-use information, the UE transmits a response message through an uplink control channel resource (PUCCH resource) linked to a group to which the UE belongs. For example, if the UE belongs to the K-th group (wherein K is a natural number), the UE may transmit a response message through an uplink control channel resource (PUCCH resource) linked to the K-th (E)CCE.

Additionally, the response message for reception of the change-of-use information (e.g., change-of-use indicator) transmitted by the UE may be configured to announce both success/failure (ACK/NACK) of reception of the information, or may be configured to announce either failure (NACK) or success (ACK) of reception of the information. For example, in the case where the UE is configured to announce only failure of reception of change-of-use information, the UE may not transmit a response message if the information is successfully received, and the base station may consider that the UE has successfully received the change-of-use information if the base station does not receive a response message from the UE (at a specific time or within a specific time interval).

In the case where UEs are configured to announce only failure (NACK) of reception of change-of-use information, the base station may consider that all UEs belonging to the K-th group have successfully received the change-of-use information if the base station does not receive a repose to failure from any of the UEs on an uplink control channel resource (PUCCH resource) linked to the K-th (E)CCE. Herein, among the UEs belonging to the K-th group, UEs belonging to a discontinuous reception (DRX) state or a measurement gap may be excluded.

In addition, in the case where change-of-use information (e.g., change-of-use indicators) is transmitted through a specific channel in predefined separated time domains, in order to ensure dynamic change, information on some predefined UL-DL configuration candidates may be transmitted through a subframe (e.g., SF #A), and information on the other candidates may be transmitted through another subframe (e.g., SF #B). For example, if cross-carrier scheduling (CCS) is configured in the CA environment according to the aforementioned configuration and thus change-of-use information about a scheduled cell is transmitted through a specific channel in a scheduling cell (or PCell), overhead to the specific channel in the scheduling cell (or PCell) may be distributed in the domain. In addition, the time to receive the change-of-use information on the specific channel may be differently defined among UEs (or UE groups)/cells (or cell groups)/TPs (or TP groups).

In addition, a subframe set for monitoring change-of-use information (e.g., change-of-use indicators) of individual UEs may be designated. Herein, information about the subframe set for monitoring change-of-use information may be delivered to the UEs by the base station through a predefined signal (e.g., a physical layer or higher layer signal).

Further, subframe sets for monitoring the change-of-use information (e.g., change-of-use indicators) for UEs may be independently (e.g., differently) designated or only some thereof may be differently designated.

As an additional example, change-of-use information (e.g., a change-of-use indicator) of a predefined specific cell/TP/CC group may be transmitted in a subframe set (subframe set #A), and change-of-use information of the other cells/TPs/CC groups may be transmitted in another subframe set (subframe set #B). Herein, the base station may deliver such information to the UEs through a predefined signal (e.g., a physical layer or higher layer signal).

In addition, if change-of-use information (e.g., a change-of-use indicator) is transmitted based on a predefined RNTI such the information is received, a UE may receive the change-of-use information on a specific channel using the RNTI. Herein, the RNTI defined for the purpose of reception of the change-of-use information may be set to a value which is common to all UEs or be differently defined for each UE group/cell group. The base station may deliver information about the RNTI to the UE through a predefined signal (e.g., a physical layer or higher layer signal).

According to an embodiment of the present invention, the cell-specific (or TP-specific) information and/or information about use of subframes (e.g., UL-DL (re)configuration) may be associated with at least one RNTI defined for the purpose of reception of change-of-use information (e.g., a change-of-use indicator). If multiple RNTIs are defined for the purpose of reception of change-of-use information, the RNTIs may be associated with independent (e.g., different) cell-specific (or TP-specific) information items and/or information items about use of subframes, or some of the RNTIs may be defined to be associated with the same cell-specific (or TP-specific) information items and/or information items about uses of subframes. In addition, the base station may deliver information about RNTI configurations to the UE though a predefined signal (e.g., a physical layer or higher layer signal).

Hereinafter, description will be given of an embodiment of the present invention applied in the case where uses for a radio resource are dynamically changed with CA applied.

In the case where uses for a radio resource in a specific cell are dynamically changed with CA applied, embodiments of the present invention described above may be applied. However. If use for a radio resource of a specific cell (or CC) is set to be determined through the operation of monitoring change-of-use information transmitted on the system information transmission channel (e.g., PBCH or paging) of the cell, the UE may not efficiently receive SCell-related change-of-use information since the UE does not monitor an independent system information transmission channel (e.g., PBCH or paging) for the SCell in the CA environment regardless of whether or not the CCS technique is applied.

That is, in the CA environment, the UE monitors a system information transmission channel (e.g., PBCH or paging) for the PCell, while system information about the SCell is delivered to the UE by the base station through RRC signaling.

Therefore, according to an embodiment, change-of-use information (e.g., a change-of-use indicator) about the SCell may be set to be transmitted through a MAC signal (or an RRC signal/physical control channel/physical data channel) for the SCell in the CA environment. For example, change-of-use information about the PCell may be set to be transmitted through a system information transmission channel (e.g., PBCH or paging), independently of the SCell. This may be interpreted as independently (e.g., differently) defining the type of a channel for receiving change-of-use information on the PCell (or scheduling cell) and the type of change-of-use information received on the SCell (or scheduled cell).

If the CCS technique is applied in the CA environment, transmitting change-of-use information (e.g., change-of-use indicators) about both the scheduling cell (or PCcell) and the scheduled cell (or SCell) through a specific channel at a specific time predefined on the scheduling cell (or PCell) may cause large channel overhead.

In this regard, according to another embodiment of the present invention, change-of-use information (e.g., a change-of-use indicator) about the scheduling cell (or PCell) and change-of-use information (e.g., a change-of-use indicator) about the scheduled cell (or SCell) transmitted through a specific channel on the scheduling cell (or PCell) may be set to be independently transmitted through predefined separated time domains. For example, if a predefined specific period (i.e., T) is 20 ms, the change-of-use information about the scheduling cell (or PCell) may be set to be transmitted in the first subframe time (i.e., SF #n) within the period, and change-of-use information about the scheduled cell (or SCell) may be set to be transmitted in a subframe (i.e., SF #(n+10)) which corresponds to a time 10 ms after the first subframe time. This may be interpreted as applying a predefined time offset value (e.g., Time Offset) between a time at which change-of-use information is transmitted in the scheduling cell (or PCell) and a time at which change-of-use information is transmitted in the scheduled cell (or SCell).

Additionally, if the CCS technique is applied in the CA environment, change-of-use information (e.g., a change-of-use indicator) about the scheduled cell may be exceptively transmitted through a specific channel of a specific time in the scheduled cell.

According to an embodiment of the present invention, if the CCS technique is applied in the CA environment, a subframe time at which change-of-use information (e.g., a change-of-use indicator) is transmitted may be differently defined according to respective cells (or CCs) in order to solve the problem of large overhead caused to the specific channel in the scheduling cell (or PCell) when change-of-use information (e.g., change-of-use indicators) about both the scheduling cell (or PCell) and the scheduled cell (or SCell) is transmitted through the specific channel.

For example, if the CCS technique is applied in the CA environment, a cell (or CC) in which change-of-use information about the scheduling cell (or PCell) and scheduled cell is transmitted may be set to the scheduling cell (or PCell), or individual cells (or CCs) corresponding to respective change-of-use information may be designated.

In addition, a subframe time at which change-of-use information (e.g., a change-of-use indicator) is transmitted may be limited to i) subframes statically used for downlink use, ii) DL subframes on an SIB, iii) or predefined specific DL subframes (e.g., a DL subframe set (i.e., SF #0, #1, #5, #6) which cannot be switched to use for transmission of PSS/SSS/PBCH).

In addition, when some cells perform communication in the same direction or a clustering technique of causing some cells to perform communication in the same direction is applied in order to attenuate interference occurring due to different communication directions of the cells, change-of-use information items about the cells may be designated through one predefined signal.

In addition, an almost blank subframe (ABS), which is one of eICIC techniques, may be applied in order to attenuate interference occurring due to different communication directions of the cells. Accordingly, subframe times at which change-of-use information is transmitted according to respective cells (or CCs) or a subframe time at which a signal related to change-of-use information about a plurality of cells may be defined to have configurability, and the base station may transmit configurability-related information (e.g., information indicating whether a specific configuration is applied, information about subframe times at which change-of-use information is transmitted according to the respective cells (or CCs)) to the UE through a predefined signal.

As an additional embodiment, in the case of NCT (in the CA environment), change-of-use information (e.g., change-of-use indicators) may be set to be received from the PCell even if a self-scheduling technique is exceptively applied. For example, the base station may transmit change-of-use information for the NCT to the UE through one of a physical control channel (e.g., EPDCCH/PDCCH), a physical data channel (e.g., PDSCH), a higher layer signal (e.g., RRC/MAC) and a system information transmission channel (e.g., PBCH/SIB/paging).

According to an embodiment of the present invention, UEs in the IDLE mode may be set to restrictively perform RRM/RLM/CSI measurement for a specific cell and/or reception of change-of-use information (e.g., a change-of-use indicator) related to the specific cell only in predefined specific DL subframes (e.g., a DL subframe set (i.e., SF #0, #1, #5, #6) use of which cannot be changed through transmission of PSS/SSS/PBCH).

According to an embodiment of the present invention, if a UE in the IDLE mode has entered an RRC connected state for a specific cell, but does not independently receive change-of-use information (e.g., a change-of-use indicator) from the specific cell, the UE may be set to restrictively perform a monitoring operation related to control information ((E)PDCCH) or reception of data (PDSCH) only in i) predefined specific DL subframes (e.g., a DL subframe set (i.e., SF #0, #1, #5, #6) use of which cannot be changed through transmission of PSS/SSS/PBCH) or ii) DL subframes on an SIB.

In addition, change-of-use information (e.g., UL-DL (re) configuration information) for each cell (or TP) may be signaled through various embodiments of the present invention described above. For example, to ensure RRM/RLM/CSI measurement of the UE according to respective cells (or TPs), some or all non-zero power CSI-RS configuration information items for the respective cells (or TPs) may be differently configured. In this context, change-of-use information configuration for the respective TPs (or cells) may be interpreted as meaning that change-of-use information is configured according to respective non-zero power CSI-RS configurations.

Additionally, regarding an interference measurement resource (IMR), if a specific cell (or TP) uses a subframe of a specific time at which the IMR is configured for UL use, the UE preferably stops interference measurement on the cell (or TP). This is intended to prevent different types (e.g., interference due to UL communication and interference due to DL communication) of interferences from being aggregated on one IMR to yield an incorrect interference measurement value, considering that the interference type varies depending on whether another cell (or TP) uses the specific subframe for UL use or DL use.

Therefore, according to an embodiment of the present invention, i) linkage between non-zero power CSI-RS configuration information and an IMR or ii) linkage between change-of-use information (e.g., UL-DL (re)configuration information) and an IMR may be defined. Herein, the linkage between non-zero power CSI-RS configuration information and an IMR or linkage between change-of-use information (e.g., UL-DL (re)configuration information) and an IMR may set to be delivered to the UE by the base station through a predefined additional signal (e.g., a physical layer signal or higher layer signal) or to be implicitly recognized based on channel state information process (a CSI process) configuration information, QCL information or PQI information.

For example, in the case where interference measurement is performed based on the CSI process configuration information, if an IMR linked to a specific CSI process is present in a subframe in which a TP (or cell) corresponding to a non-zero power CSI-RS linked to the CSI process is configured for UL use, the UE may exclude a measurement value on the IMR so as not to be used in calculating RI/PMI/CQI in the CSI process such that interference measurement is performed only when the TP is configured for DL use.

As another example, if interference measurement is performed based on QCL information, each IMR may be connected to at least one non-zero power CSI-RS. In this case, the QCL information may be considered as indicating QCL between the IMR and the non-zero power CSI-RS. Thereby, the IMR may be considered a valid measurement resource if a TP (or cell) corresponding to the non-zero power CST-RS connected to an TMR is configured for DL use, and may be considered invalid if the TP (or cell) is configured for UL use.

If interference measurement is performed based on PQI information, a zero-power CSI-RS appearing in the same PQI state as a non-zero power CSI-RS linked to a specific TP (or cell) may be recognized in a subframe in which the TP is configured for DL use. If the zero-power CSI-RS includes a resource element (RE) of a specific IMR, measurement may be performed, considering that the IMR is valid. If all non-zero power CSI-RSs appearing in the same PQ1 state as zero-power CSI-RSs including the IMR are configured for UL use, the TMR may be considered invalid.

Alternatively, the base station may not apply the implicit rule described above. Instead, the base station may pre-signal an explicit rule. For example, the base station may designate a condition under which individual IMRs are valid or invalid for interference measurement. In particular, the condition for validity of interference measurement may be that each TP (or cell) should be configured for UL use or DL use or that a non-zero power CSI-RS configuration of the TP should be established for UL use or DL use. For example, the condition for interference measurement may be established such that IMR #1 is valid when TP #1 is configured for DL use, and TP #2 is configured for UL use.

In addition, according to an embodiment of the present invention, the base station may deliver change-of-use information (e.g., a change-of-use indicator) to the UE (re)using an existing predefined specific DCI format.

For example, change-of-use information may be transmitted (re)using DCI format 3/3A among existing DCI formats. For DCI format 3/3A, the base station delivers, to a specific UE, RNTI information used in detecting (i.e., blind decoding) DCI format 3/3A and field index information indicating the position of a field assigned to the specific UE in DCI format 3/3A through a higher layer signal (e.g., RRC signaling). When the UE receives such information, the UE detects DCI format 3/3A in the CSS and/or acquires the information from the field at a specific position in DCI format 3/3A. Using the property of DCI format 3/3A, the base station may configure a specific field (or DCI format) of DCI format 3/3A for the specific UE through a predefined signal (e.g., a higher layer signal or physical layer signal) such that use of the specific field is changed to transmission of change-of-use information. Using a predefined signal, the base station may transmit, to the specific UE, the following information.

Field position (or field index) information which is used for transmission of change-of-use information, not for transmission of TPC information For example, multiple fields may be configured for transmission of change-of-use information for the specific UE. That is, a combination of multiple fields or a combination of bits in the multiple fields may be pre-configured such that meaning of change-of-use information is recognized through the combination.

For example, the field used for transmission of change-of-use information may be used to transmit not only change-of-use information of the serving cell but also change-of-use information of a neighboring cell (participating in cooperative communication).

The base station may configure, for the specific UE, a field used for transmission of TPC information and a field used for transmission of change-of-use information together.

For example, if DCI format 3/3A is detected at any time, the specific UE may receive the information for the two purposes (i.e., TPC information, change-of-use information) at the positions of the predefined fields (serving the respective purposes).

Alternatively, if DCI format 3/3A is detected at any time, the specific UE may receive the information for the two purposes (i.e., TPC information, change-of-use information) at the predefined fields (serving the respective purposes) simultaneously.

If a specific field of DCI format 3/3A is changed to use for transmission of change-of-use information, DCI format 3/3A may be transmitted through another predefined search space (e.g., a USS) or a specific control channel (e.g., EPDCCH) rather than through the CSS.

If a specific field of DCI format 3/3A is changed to use for transmission of change-of-use information, RNTI information used in detecting DCI format 3/3A may be assumed as in the case where DCI format 3/3A is used for the existing purpose (i.e., transmission of TPC information) in view of the specific UE. Alternatively, if DCI format 3/3A is used for the existing purpose (i.e., transmission of TPC information) in view of the specific UE, the base station may additionally deliver RNTI information used in detecting DCI format 3/3A to the UE through a predefined signal (e.g., a physical layer signal or higher layer signal) such that the information is differently defined.

According to another embodiment of the present invention, if change-of-use information (e.g., a change-of-use indicator) is transmitted through a predefined format (e.g., DCI format 3/3A), CRC bits associated with the format/change-of-use information may be configured to be relatively long. By adjusting the length of the CRC bits, the probability of False Alarm of the change-of-use information may be reduced. Information about the length/content of the CRC bits may be delivered to the UE by the base station through a predefined signal (e.g., a higher layer signal or physical layer signal). Additionally, the method and principle described above may be applied to all cases where change-of-use information is transmitted through a predefined format.

Hereinafter, description will be given of explicit L1 signaling, which is a technique of signaling for reconfiguration. A group of UEs monitors a common (E)PDCCH to receive reconfiguration signaling. Accordingly, the common search space (CSS) may be selected as a search space for L1 signaling. In addition, reliability of the CSS may be low in some subframes due to inter-cell interferences, but reliable CSS monitoring (detection) needs to be ensured for connectivity of the UE in at least some subframes in a cell. A reconfiguration signal needs to be transmitted in only a few subframes (almost once every 10 ms). For this reason, the CSS may be used.

It addition, it is not preferable to increase only the number of times of bind decoding in some selected subframes in which a reconfiguration signal is transmitted. If the reconfiguration signal uses DCI having the same length as DCI format 0 or DCI format 1C in the CSS, additional blind decoding may be avoided. In this case, the reconfiguration signal may be distinguished from the DCIs (i.e., DCI formats 0 and 1C) by using a different RNTI configured by the base station (eNB).

Accordingly, according to an embodiment of the present invention, L1 signaling for UL-DL reconfiguration may be transmitted in the CSS. The format of the UL-DL reconfiguration signal may be set to DCI format 0 or DCI format 1C. The eNB may configure, for UEs, RNTIs to be used to decode DCI including UL-DL reconfiguration.

Even if a new DCI is transmitted in the CSS and received by the group of the UEs, the content thereof (UL-DL configuration indicated to the UE) does not need to be the same for all UEs. However, the received DCI is preferably UE-specifically interpreted. This is because UEs may be associated with different cells when the UEs support CA or CoMP.

In the present invention, in order to UE-specifically interpret a UE group common DCI, an extended version of the configuration used in DCI format 3/3A is applied. That is, even if a group of UEs receives the same DCI format 3/3A, the respective UEs may derive TPC indication associated therewith from different bit positions in the DCI which is received in common.

Figure 17:
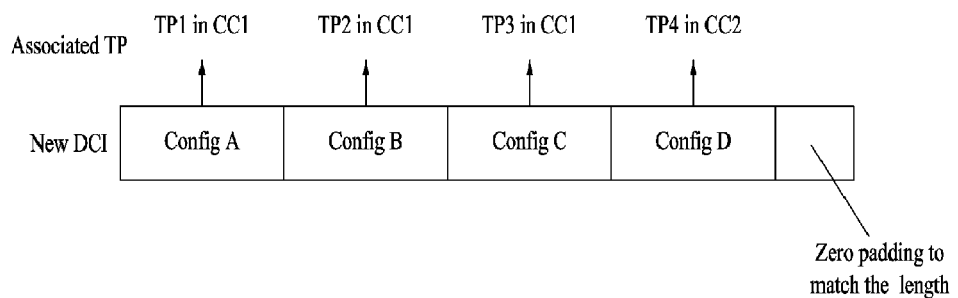
FIG. 17 illustrates new DCI for UL-DL reconfiguration according to an embodiment of the present invention.

FIG. 17 shows new DCI for UL-DL reconfiguration reflecting the configuration described above according to an embodiment of the present invention. The DCI may be transmitted including a concatenation of multiple UL-DL configurations. Each of the UL-DL configurations may be associated with a specific cell/TP, and the base station may transmit information about the same to the UEs before the new DCI is monitored. Accordingly, each UE may detect the UL-DL configuration of a neighboring cell/TP according to the eNB configuration and the received DCI.

As the aforementioned operation is performed, a UE to which CA is applied may recognize UL-DL configurations for respective CCs, and an UE to which CoMP is applied may be recognize UL-DL configuration for respective TPs for CoMP measurement. In addition, a UE for non-CoMP/non-CA may recognize the UL-DL configuration of a neighboring cell which may be used for CST measurement.

Accordingly, if multiple cells/TPs have the same UL-DL configuration, UL-DL configurations according to DCI may be associated with the multiple cells/TP.

That is, new DCI for a UL-DL reconfiguration may be transmitted by concatenating multiple UL-DL configurations, and each of the UL-DL configurations may be associated with a specific cell/TP according to configuration of the base station. The new DCI for the UL-DL reconfiguration may not be transmitted in all DL subframes. This is because the maximum rate for reconfiguration is one transmission per 10 ms.

Accordingly, subframes used to transmit the new DCI need to be defined, and the UE should not monitor DL subframes except the defined subframes in order to prevent unnecessary false alarm.

Basically, the UL-DL reconfiguration speed depends on various factors such as a backhaul link speed, an adopted ICIC scheme, expected traffic fluctuation and the portion of legacy UEs that are unable to understand this configuration change.

UL-DL reconfiguration according to L1 signaling may be UE-specifically established for UEs of legacy 3GPP LTE Rel-11. In this case, network configurability is allowed in determining subframes in which reconfiguration DCI transmitted.

In other words, each eNB may set the period and offset of subframes in which new DCI for UL-DL reconfiguration is transmitted. Herein, the period may be determined based on reconfiguration speeds considering the aforementioned factors.

The offset may be determined such that transmission of reconfiguration DCI may avoid inter-cell interference. For example, the offset may be determined in consideration of ABS configurations of neighboring cells, or be determined such that the offset differs in time from subframes for reconfiguration signals of the neighboring cells.

Regarding reception of a network monitoring and control signal, after decoding new DCI for UL-DL reconfiguration, the UE may recognize two differently defined UL/DL subframes.

One subframe is a definition according to a UL-DL configuration on one SIB, and the other one is a UL-DL configuration defined by new DCI.

(E)PDCCH/PDSCH/PUSCH-related operation of the UE may conform to configuration defined in the new DCI. For example, the UE may monitor (E)PDCCH and PDSCH only in a special subframe or DL subframe associated with a cell/TP and indicated by the new DCI for UL-DL reconfiguration.

Further, the same method may be adopted even in monitoring UL control information (e.g., UL grant). If the DU/special subframe indicated as being associated with a cell/TP by the new DCI is scheduled for PUSCH transmission, the UE may discard detected UL control information. In this way, unnecessary false alarm and misbehavior of the UE may be avoided.

It is apparent that the examples/embodiments/method of the present invention described above may be included in one of the technical solutions proposed in the present invention and be considered as one embodiment of the present invention. In addition, the embodiments of the present invention described above may be independently implemented or a combination or concatenation of some embodiments may be implemented.

In addition, a base station may deliver information on an embodiment/rule/configuration or information on whether or not the embodiment/rule/configuration is adopted, base station to the UE through a predefined signal (e.g., a physical layer or higher layer signal).

Further, embodiments of the present invention may be restrictively adopted only when a dynamic change mode for a radio resource is set.

Additionally, in the embodiments described above, QCL information may be interpreted as "QCL information between a specific reference signal (e.g., DM-RS) used in decoding PDSCH and another predefined reference signal (e.g., CSI-RS, CRS)" and/or 'QCL information between a specific reference signal (e.g., DM-RS) used in decoding EPDCCH and another predefined reference signal (e.g., CSI-RS, CRS)".

It is apparent that an example/embodiment/method given above to describe the present invention may be included as one example and correspond to a technical solution to the technical problem which the present invention seeks to solve.

Various embodiments of the present invention described above may be independently applied. It is apparent that a combination of a part or entirety of at least one embodiment is also included in the technical solution proposed in the present invention.

Figure 18:
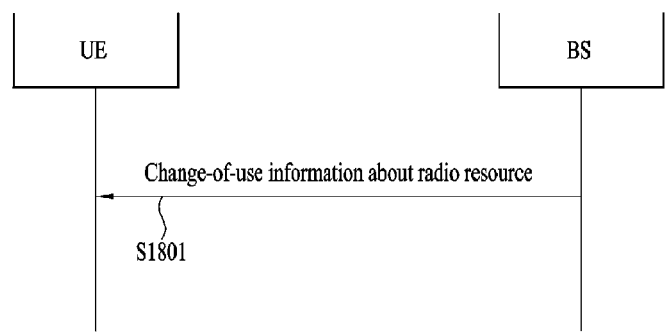
FIG. 18 illustrates a method for transmitting and receiving a signal according to one embodiment of the present invention.

FIG. 18 illustrates a method for receiving DCI according to one embodiment of the present invention.

Referring to FIG. 18, a UE receives, from a BS, change-of-use information about a radio resource, e.g., a change-of-use indicator or DL information related to reconfiguration of a radio resource (S1801).

That is, in step S1801 of FIG. 18, the UE may receive information related to change of use of a radio resource according to one embodiment of the present invention. In step S1801, the information/configuration/rule related to change of use/reconfiguration of a radio resource may be configured as described in the embodiments of the present invention given above. In some cases, the information may be determined by a combination of at least a part of the embodiments of the present invention.

In implementing the communication method of the present invention using CA as described above with reference to FIG. 18, various embodiments of the present disclosure described above may be independently applied, or two or more of the embodiments may be applied in combination. For clarity, redundant description will be omitted.

Figure 19:
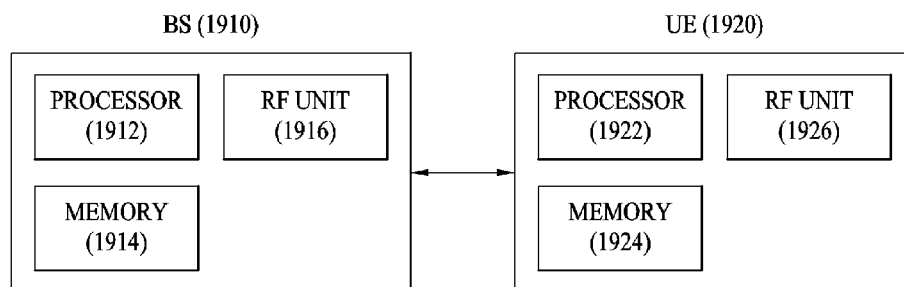
FIG. 19 exemplarily shows a base station and a user equipment which are applicable to an embodiment of the present invention.

FIG. 19 exemplarily shows a base station and a UE which are applicable to an embodiment of the present invention. If a relay is included in a wireless communication system, communication on the backhaul link may be performed between the base station and the relay, and communication on the access link is performed between the relay and the UE. Accordingly, the base station or UE illustrated in the figure may be replaced with the relay according to a situation.

Referring to FIG. 19, a wireless communication system includes a BS 1910 and a UE 1920. The BS 1910 includes a processor 1912, a memory 1914 and a radio frequency (RF) unit 1916. The processor 1912 may be configured to implement the procedures and/or methods proposed in the present invention. The memory 1914 is connected to the processor 1912 and stores various kinds information related to operation of the processor 1912. The RF unit 1916 is connected to the processor 1912, and transmits and/or receives a radio signal. The UE 1920 includes a processor 1922, a memory 1924 and an RF unit 1926. The processor 1922 may be configured to implement the procedures and/or methods proposed in the present invention. The memory 1924 is connected to the processor 1922 and stores various kinds information related to operation of the processor 1922. The RF unit 1926 is connected to the processor 1922, and transmits and/or receives a radio signal. The BS 1910 and/or the UE 1920 may have a single antenna or multiple antennas.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

Embodiments of the present invention may be implemented by various means such as, for example, hardware, firmware, software, or combinations thereof. When practiced in hardware, one embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When practiced in firmware or software, an embodiment of the present invention may be implemented in the form of a module, a procedure, a function, or the like which performs the functions or operations described above. Software code may be stored in the memory unit and executed by the processor. The memory unit may be disposed inside or outside the processor to transceive data with the processor via various well-known means.

The present invention may be carried out in other specific ways than those set forth herein without departing from the characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for receiving downlink control information in a wireless communication system and an apparatus for the same have been described above, focusing on a case where the present invention is applied to a 3GPP LTE system. The present invention may also be applied to various wireless communication systems other than the 3GPP LTE system.

The invention claimed is:

1. A base station transmitting downlink control information (DCI) in a wireless communication system, the base station comprising:
 a transmitter and a receiver, and
 a processor, operatively coupled to the transmitter and receiver, wherein the processor is configured to:
 control the transmitter to transmit configuration information including position information for a bit position in the DCI corresponding to each of a plurality of cells through RRC (Radio Resource Control) signaling, and transmit the DCI including a plurality of resource format indicators related to a resource configuration related to the plurality of cells,
 wherein a resource format indicator for each of the plurality of cells is identified from the DCI based on the bit position included in the position information.

2. The base station according to claim 1, wherein the number of resource format indicators that make up the plurality of resource format indicators included in the DCI is based on a size related to a format of the DCI.

3. The base station according to claim 1, wherein the DCI is transmitted through a common search space of the base station.

4. The base station according to claim 1, wherein one resource format indicator among the plurality of resource format indicators is preconfigured for one cell among the plurality of cells.

5. The base station according to claim 1, wherein the positioning information includes information on different bit positions between the plurality of cells in DCI.

6. A user equipment (UE) determining a resource format in a wireless communication system, the UE comprising:
   a transmitter and a receiver, and
   a processor, operatively coupled to the transmitter and receiver, wherein the processor is configured to:
   control the receiver to receive configuration information including position information for a bit position in a downlink control information (DCI) corresponding to each of a plurality of cells through RRC (Radio Resource Control signaling, and
   control the receiver to receive the DCI including a plurality of resource format indicators related to a resource configuration related to the plurality of cells,
   wherein a resource format indicator for each of the plurality of cells is identified from the DCI based on the bit position included in the position information.

7. The UE according to claim 6, wherein the number of resource format indicators that make up the plurality of resource format indicators included in the DCI is based on a size related to a format of the DCI.

8. The UE according to claim 6, wherein the DCI is transmitted through a common search space of the cell.

9. The UE according to claim 6, wherein one resource format indicator among the plurality of resource format indicators is preconfigured for one cell among the plurality of cells.

10. The UE according to claim 6, wherein the positioning information includes information on different bit positions between the plurality of cells in DCI.

11. A method of determining a resource format by a user equipment (UE) in a wireless communication system, the method comprising:
    receiving configuration information including position information for a bit position in the DCI corresponding to each of a plurality of cells through RRC (Radio Resource Control) signaling; and
    receiving a downlink control information (DCI) including a plurality of resource format indicators related to a resource configuration related to the plurality of cells,
    wherein a resource format indicator for each of the plurality of cells is identified from the DCI based on the bit position included in the position information.

12. The method according to claim 11, wherein the number of resource format indicators that make up the plurality of resource format indicators included in the DCI is based on a size related to a format of the DCI.

13. The method according to claim 11, wherein the DCI is transmitted through a common search space of a base station.

14. The method according to claim 11, wherein one resource format indicator among the plurality of resource format indicators is preconfigured for one cell among the plurality of cells.

15. The method according to claim 11, wherein the positioning information includes information on different bit positions between the plurality of cells in DCI.

* * * * *